US012282292B2

(12) United States Patent
Sugawara et al.

(10) Patent No.: US 12,282,292 B2
(45) Date of Patent: Apr. 22, 2025

(54) ELECTROSTATIC CHARGE IMAGE DEVELOPING TONER, ELECTROSTATIC CHARGE IMAGE DEVELOPER, AND TONER CARTRIDGE

(71) Applicant: FUJIFILM Business Innovation Corp., Tokyo (JP)

(72) Inventors: Atsushi Sugawara, Kanagawa (JP); Yoshimasa Fujihara, Kanagawa (JP); Kazutsuna Sasaki, Kanagawa (JP); Takashi Inukai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 662 days.

(21) Appl. No.: 17/575,608

(22) Filed: Jan. 13, 2022

(65) Prior Publication Data

US 2023/0098553 A1 Mar. 30, 2023

(30) Foreign Application Priority Data

Sep. 24, 2021 (JP) ................................ 2021-156202

(51) Int. Cl.

| | |
|---|---|
| ***G03G 9/08*** | (2006.01) |
| ***G03G 9/087*** | (2006.01) |
| ***G03G 9/097*** | (2006.01) |
| ***G03G 15/08*** | (2006.01) |

(52) U.S. Cl.

CPC ......... *G03G 9/0819* (2013.01); *G03G 9/0827* (2013.01); *G03G 9/08711* (2013.01); *G03G 9/08755* (2013.01); *G03G 9/08788* (2013.01); *G03G 9/09708* (2013.01); *G03G 15/0822* (2013.01)

(58) Field of Classification Search

CPC ............... G03G 9/0819; G03G 9/0827; G03G 9/08711; G03G 9/08755; G03G 9/08788; G03G 9/09708

See application file for complete search history.

(56) References Cited

U.S. PATENT DOCUMENTS

| | | | | |
|---|---|---|---|---|
| 2007/0166635 A1* | 7/2007 | Yamamoto | ........... | G03G 9/0819 430/108.8 |
| 2013/0065174 A1* | 3/2013 | Itabashi | ............. | G03G 9/09791 430/108.4 |
| 2019/0196363 A1* | 6/2019 | Tanaka | ............... | G03G 21/1676 |
| 2019/0384196 A1* | 12/2019 | Kamae | ............... | G03G 9/08713 |
| 2020/0089137 A1* | 3/2020 | Sugawara | .......... | G03G 9/08755 |
| 2020/0292953 A1* | 9/2020 | Nakayama | ......... | G03G 9/08755 |

FOREIGN PATENT DOCUMENTS

| | | |
|---|---|---|
| JP | 2004287185 A * | 10/2004 |
| JP | 2020154294 | 9/2020 |
| JP | 2021033155 | 3/2021 |

OTHER PUBLICATIONS

English machine translation of the description of JP-2004287185-A (Year: 2004).*

* cited by examiner

*Primary Examiner* — Peter L Vajda
*Assistant Examiner* — Boone Alexander Evans
(74) *Attorney, Agent, or Firm* — JCIPRNET

(57) ABSTRACT

An electrostatic charge image developing toner includes a toner particle containing a binder resin, a release agent, a divalent metal, and a trivalent metal, in which the release agent has a domain diameter of 0.5 μm or greater and 1.5 μm or less.

13 Claims, 3 Drawing Sheets

ELECTROSTATIC CHARGE IMAGE DEVELOPING TONER, ELECTROSTATIC CHARGE IMAGE DEVELOPER, AND TONER CARTRIDGE

CROSS-REFERENCE TO RELATED APPLICATIONS

This application is based on and claims priority under 35 USC 119 from Japanese Patent Application No. 2021-156202 filed Sep. 24, 2021.

BACKGROUND

(i) Technical Field

Methods of visualizing image information, such as electrophotographic methods, are currently used in various fields. In the electrophotographic methods, an electrostatic charge image is formed as image information on a surface of an image holding member by charging the surface thereof and forming an electrostatic charge image. Further, a toner image is formed on the surface of the image holding member using a developer containing a toner, the toner image is transferred to a recording medium, and the toner image is fixed to the recording medium. The image information is visualized as an image by performing such steps.

For example, JP2020-154294A discloses a toner that contains toner particles containing a polyester resin and a polyvalent metal element.

Further, JP2021-033155A discloses a toner that contains toner particles containing a binder resin, a wax, and a fatty acid metal salt, in which domains of the wax are present on a cross section of the toner particle observed by a scanning transmission electron microscope, and the equivalent circle number average diameter of the domains is 30 nm or greater and 1000 nm or less.

SUMMARY

Aspects of non-limiting embodiments of the present disclosure relate to an electrostatic charge image developing toner, an electrostatic charge image developer, and a toner cartridge, the electrostatic charge image developing toner enabling an image with suppressed gloss unevenness to be obtained, as compared with a case of containing a toner particle that contains a binder resin, a release agent, and only one of a divalent metal and a trivalent metal or a toner particle that contains a binder resin, a release agent, a divalent metal, and a trivalent metal, in which the release agent has a domain diameter of less than 0.5 μm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for solving the above problems include the following aspects.

According to an aspect of the present disclosure, there is provided an electrostatic charge image developing toner including: a toner particle containing a binder resin, a release agent, a divalent metal, and a trivalent metal, in which the release agent has a domain diameter of 0.5 μm or greater and 1.5 μm or less.

BRIEF DESCRIPTION OF THE DRAWINGS

Exemplary embodiment(s) of the present invention will be described in detail based on the following figures, wherein.

DETAILED DESCRIPTION

Figure 1:
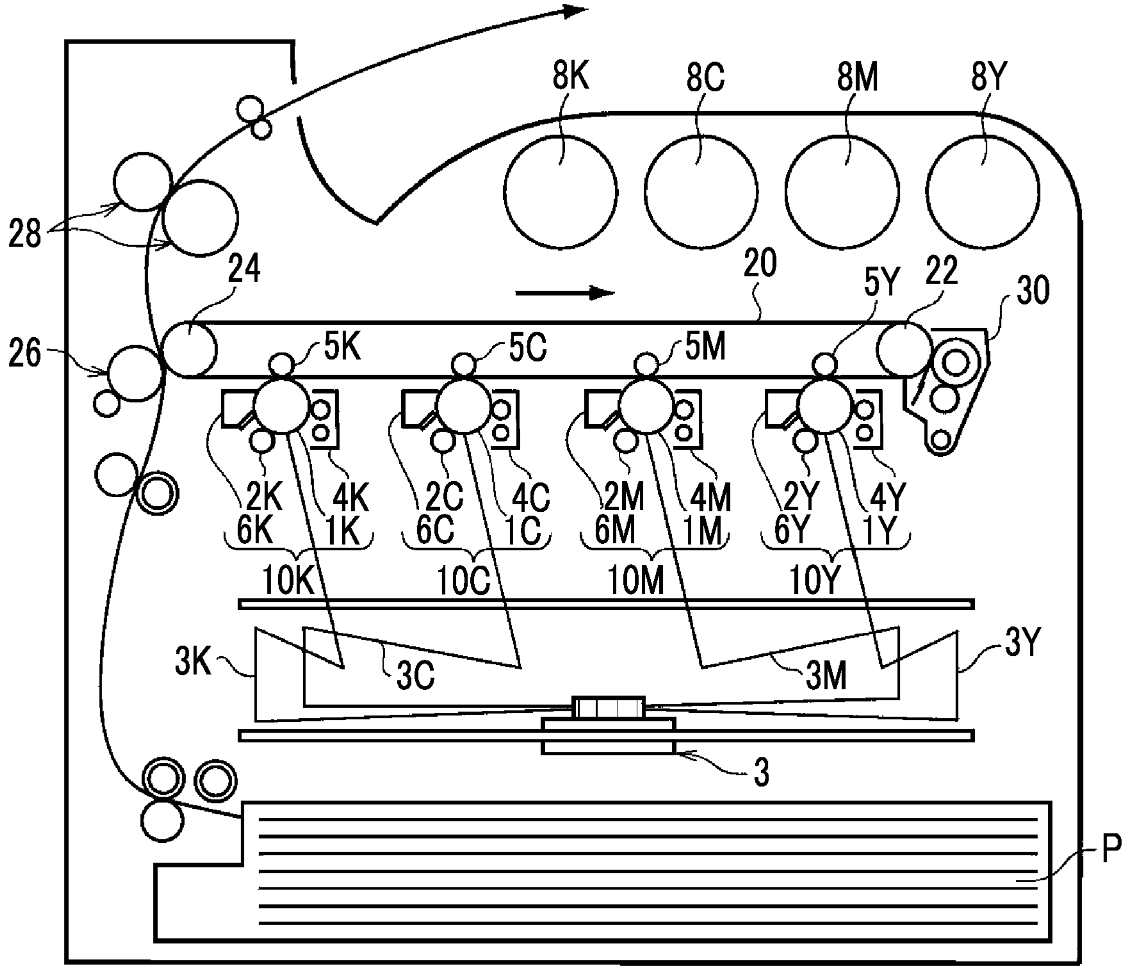
FIG. 1 is a schematic configuration view showing an example of an image forming device according to the present exemplary embodiment.

Hereinafter, an example of one exemplary embodiment of the present invention will be described in detail. The following descriptions and examples merely illustrate the exemplary embodiments, and do not limit the scope of the exemplary embodiments.

In a numerical range described in a stepwise manner in the present specification, an upper limit or a lower limit described in a certain numerical range may be replaced with an upper limit or a lower limit in another numerical range described in a stepwise manner.

Further, in a numerical range, an upper limit or a lower limit described in a certain numerical range may be replaced with a value shown in an example.

In the present specification, a case where a plurality of kinds of substances corresponding to each component in a composition are present, the amount of each component in the composition indicates the total amount of the plurality of kinds of substances present in the composition unless otherwise specified.

In the present disclosure, the meaning of the term "step" includes not only an independent step but also a step whose intended purpose is achieved even in a case where the step is not clearly distinguished from other steps.

In the present specification, an "electrostatic charge image developing toner" is also simply referred to as a "toner", and an "electrostatic charge image developer" is also simply referred to as a "developer".

Further, in the present specification, the expression "the toner according to the present disclosure" includes both a first exemplary embodiment and a second exemplary embodiment described below, unless otherwise specified.

First Exemplary Embodiment and Second Exemplary Embodiment of Electrostatic Charge Image Developing Toner According to the first exemplary embodiment of an electrostatic charge image developing toner according to the present disclosure, the electrostatic charge image developing toner contains a toner particle containing a binder resin, a release agent, a divalent metal, and a trivalent metal, in which the release agent has a domain diameter of 0.5 μm or greater and 1.5 μm or less.

Further, according to the second exemplary embodiment of an electrostatic charge image developing toner according to the present disclosure, the electrostatic charge image developing toner contains a toner particle containing a binder resin, a release agent, a divalent metal, and a trivalent metal, in which the ratio of the domain diameter of the release agent to the maximum diameter of the toner particle is 10% or greater and 30% or less.

In the toner particle of the toner, a method of increasing the domain diameter of the release agent in the toner particle (for example, 0.5 μm or greater) to facilitate bleeding out of the release agent may be employed.

Even in a case where a toner to which this method is applied is used, a part of a toner image may be transferred to a side of a fixing member due to the peelability between the fixing member and the toner image depending on the image output condition, and thus gloss unevenness may occur in the output image. For example, gloss unevenness in the output image is remarkable under a condition that a secondary color halftone is output. The term "gloss unevenness" here that, for example, a difference in gloss occurs in images for each output in a case where a plurality of the identical images are output.

In addition, the toner particle in the toner according to the exemplary embodiment of the present disclosure contains a divalent metal and a trivalent metal in addition to a binder resin and a release agent. Both the divalent metal and the trivalent metal contribute to aggregation of molecular chains of the binder resin by ion crosslinking. In particular, according to the trivalent metal, a three-dimensional crosslinked structure (hereinafter, also referred to as a "three-dimensional crosslinked structure of the binder resin") can be formed as an aggregate of the molecular chains of the binder resin. A toner particle having such a three-dimensional crosslinked structure of the binder resin is assumed to have a higher elastic force than the elastic force of a toner particle that does not have the three-dimensional crosslinked structure of the binder resin and to increase the peelability between a fixing member and a toner image.

Further, the toner particle in the toner according to the exemplary embodiment of the present disclosure also has a characteristic that the domain diameter of the release agent is large and the release agent easily bleeds out.

As described above, it is assumed that since the toner according to the exemplary embodiment contains a toner particle containing a release agent with a large domain diameter and having a three-dimensional crosslinked structure of the binder resin, an image with suppressed gloss unevenness can be obtained.

Hereinafter, the domain of the release agent in the toner particle will be described.

Here, the domain of the release agent will be described with reference to the cross section of the toner particle shown in FIG. 3.

Figure 3:
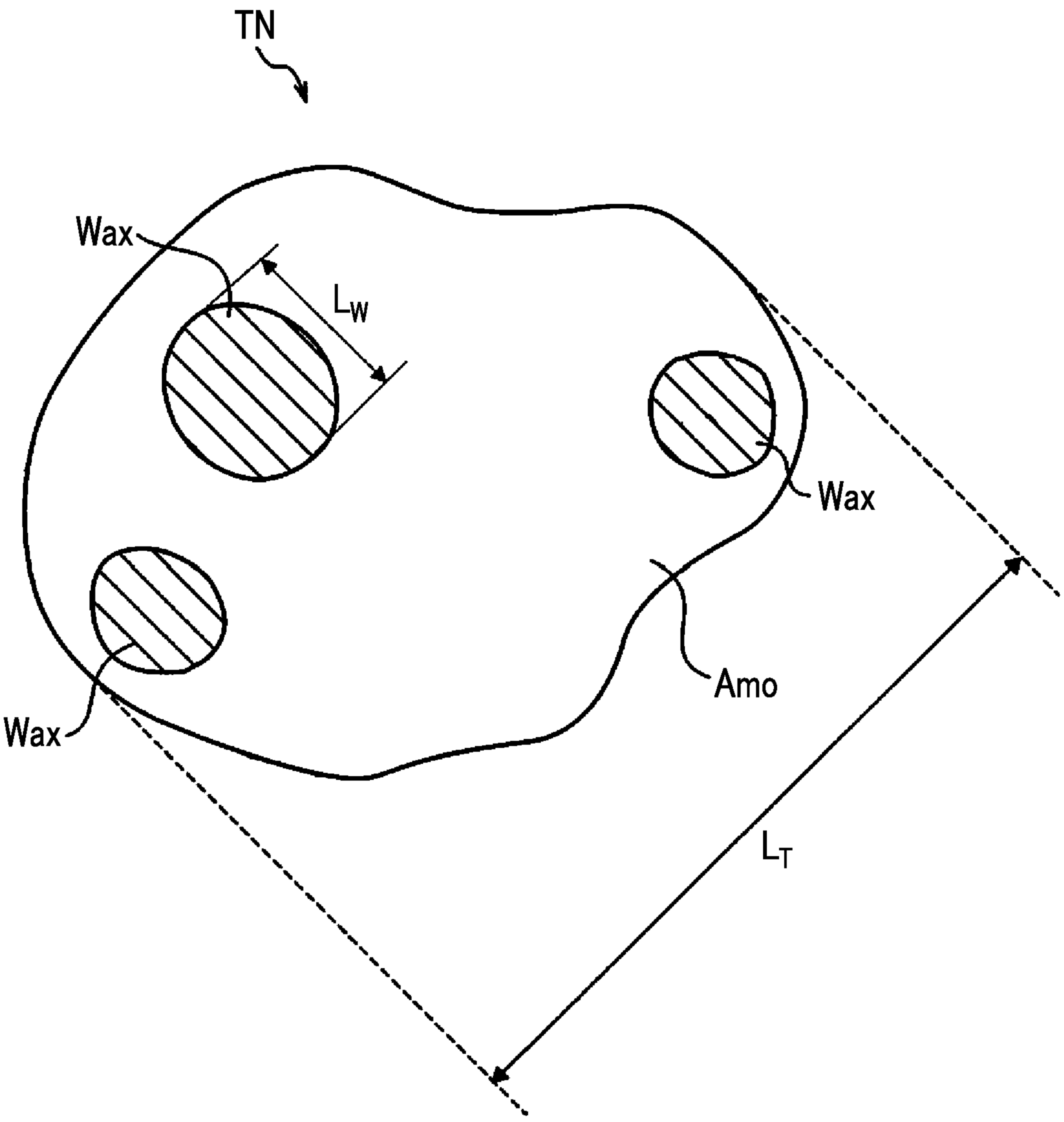
FIG. 3 is a schematic view showing a cross section of a toner particle in an electrostatic charge image developing toner according to the present disclosure.

FIG. 3 is a schematic view showing a cross section of the toner particle contained in the toner according to the exemplary embodiment of the present disclosure. In each reference numeral shown in FIG. 3, TN represents the toner particle, Wax represents a domain of the release agent, Amo represents the binder resin, $L_T$ represents the maximum diameter of the toner particle, and Lw is the domain diameter of the release agent.

As shown in FIG. 3, the domain diameter of the release agent indicates the maximum diameter of the domain of the release agent (that is, the maximum length of a straight line drawn between two arbitrary points on the contour line of the cross section of the release agent).

Further, the maximum diameter of the toner particle indicates the maximum length of a straight line drawn between two arbitrary points on the contour line of the cross section of the toner particle.

As shown in FIG. 3, the domain Wax of the release agent is scattered in the toner particle TN.

In the toner according to the exemplary embodiment of the present disclosure, the domain diameter Lw of the release agent is 0.5 μm or greater and 1.5 μm or less (first exemplary embodiment), or the ratio of the domain diameter Lw of the release agent to the maximum diameter $L_T$ of the toner particle is 10% or greater and 30% or less (second exemplary embodiment).

In the first exemplary embodiment of the toner according to the present disclosure, from the viewpoint that the release agent easily bleeds out, the domain diameter of the release agent is, for example, preferably 0.8 μm or greater and 1.2 μm or less.

Further, in the second exemplary embodiment of the toner according to the present disclosure, from the viewpoint that the release agent easily bleeds out, the domain diameter of the release agent is, for example, preferably 0.5 μm or greater and 1.5 μm or less and more preferably 0.8 μm or greater and 1.2 μm or less.

Further, in the second exemplary embodiment of the toner according to the present disclosure, from the viewpoint that the release agent easily bleeds out, the ratio of the domain diameter Lw of the release agent to the maximum diameter $L_T$ of the toner particle is, for example, preferably 10% or greater and 30% or less.

In the first exemplary embodiment of the toner according to the present disclosure, from the viewpoint that the release agent easily bleeds out, the ratio of the domain diameter Lw of the release agent to the maximum diameter $L_T$ of the toner particles is, for example, preferably 10% or greater and 30% or less and more preferably 15% or greater and 30% or less.

In the toner particle of the toner according to the exemplary embodiment of the present disclosure, from the viewpoint that the release agent easily bleeds out, the circularity of the domain of the release agent is, for example, preferably 0.9 or greater and 1.0 or less and more preferably 0.94 or greater and 1.0 or less.

The circularity of the domain of the release agent is the circularity defined by Equation (1).

$$\text{Circularity}(100/\text{SF2})=4\pi\times(A/I^2) \qquad \text{Equation (1):}$$

In Formula (1), I represents the perimeter of the domain of the release agent, and A represents the area of the domain of the release agent.

In the toner particle of the toner according to the embodiment of the present disclosure, it is preferable that the center of gravity of the domain of the release agent is, for example, present inside a region of the toner particle to a depth of 0.5 μm from the surface. That is, it is preferable that the domain of the release agent is, for example, present inside the surface layer of the toner particle (a region of the toner particle to a depth of 0.5 μm from the surface of the toner particle). With this aspect, an image with further suppressed gloss unevenness can be obtained.

Hereinafter, a method of measuring the maximum diameter of the toner particle, the domain diameter of the release agent, and the circularity of the domain of the release agent and a method of confirming the position where the domain of the release agent is present will be described.

The maximum diameter of the toner particle, the domain diameter of the release agent, the circularity of the domain of the release agent, and the position where the domain of the release agent is present are all acquired by observing a cross section of the toner particle.

The method of observing a cross section of the toner particle is as follows.

The toner particles (or toner particles to which an external additive is attached) are mixed with an epoxy resin so as to be embedded, and the epoxy resin is solidified. The obtained solidified product is cut by an ultramicrotome device (UltracutUCT, manufactured by Leica Corporation) to prepare a thin sample having a thickness of 80 nm or greater and 130 nm or less. Next, the obtained thin sample is dyed with ruthenium tetroxide in a desiccator at 30° C. for 3 hours. Further, a STEM observation image (acceleration voltage: 30 kV, magnification: 20000 times) in a transmission image mode of the dyed thin sample is obtained using an ultra-high resolution field emission scanning electron microscope (FE-SEM, S-4800, manufactured by Hitachi High-Tech Corporation).

In the toner particle, the binder resin (the crystalline resin and the amorphous resin) and the release agent are determined from the contrast and the shape. In the STEM observation image, the binder resin other than the release agent has multiple double bond portions and is dyed with ruthenium tetroxide, and thus the release agent portion and the resin portion other than the release agent are distinguished from each other. More specifically, by carrying out ruthenium dyeing, the release agent is dyed lightest, the crystalline resin (for example, a crystalline polyester resin) is dyed, and the amorphous resin (for example, an amorphous polyester resin) is dyed deepest. By adjusting the contrast, the release agent is observed to be white, the amorphous resin is observed to be black, and the crystalline resin is observed to be light gray. In this manner, the domain of the release agent is determined.

The number of samplings in a case of observation of cross sections of the toner particles is 100. Further, since the STEM observation image includes cross sections of toner particles with various sizes, the cross sections of toner particles having a volume average particle diameter of 85% or greater are selected and the toner particles are used as an observation target. Here, the diameter of a cross section of the toner particle indicates the maximum length (so-called long diameter) of a straight line drawn between two arbitrary points on the contour line of the cross section of the toner particle.

The maximum diameter of the toner particle, the domain diameter of the release agent, and the circularity of the domain of the release agent are acquired by the following methods.

First, the domain of the release agent having a domain of 0.5 μm or greater per one toner particle is extracted using the STEM observation image, the maximum diameter and circularity of the domain are acquired, and the arithmetic average values are respectively calculated. The same operation is performed on 100 toner particles, and the arithmetic average value of the values obtained from 100 toner particles is calculated, and the calculated value is defined as the "domain diameter of the release agent" and the "circularity of the domain of the release agent". Further, the maximum arithmetic average value of 100 toner particles used to acquire the "domain diameter of the release agent" and the "circularity of the domain of the release agent" is also calculated, and the calculated value is defined as the "maximum value of the toner particle".

Further, "the ratio of the domain diameter of the release agent to the maximum diameter of the toner particle" is obtained using Expression (2) based on the obtained "maximum value of the toner particle" and the "domain diameter of the release agent".

$$\text{domain diameter of release agent/maximum value of toner particle} \times 100 \qquad \text{Expression (2):}$$

Hereinafter, the toner according to the exemplary embodiment of the present disclosure will be described in detail.

The toner according to the exemplary embodiment of the present disclosure contains toner particles. The toner may contain an external additive in addition to the toner particles.

Toner Particles

Toner particles contain a binder resin and a release agent. Further, the toner particles may contain a colorant and other additives.

Binder Resin

Examples of the binder resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of such monomers.

Other examples of the binder resin include non-vinyl-based resins such as an epoxy resin, a polyester resin, a polyurethane resin, a polyamide resin, a cellulose resin, a polyether resin, and modified rosin, mixtures of such resins with the above-described vinyl-based resins, and graft polymers obtained by polymerizing vinyl-based monomers in the coexistence of such resins.

Such binder resins may be used alone or in combination of two or more kinds thereof.

In particular, it is preferable to apply, for example, an amorphous resin and a crystalline resin as the binder resin.

Here, the mass ratio of the crystalline resin to the amorphous resin (crystalline resin/amorphous resin) is, for example, preferably 3/97 or greater and 50/50 or less and more preferably 7/93 or greater and 30/70 or less.

In a case where the amorphous resin and the crystalline resin are applied, the meltability of the toner during fixation is enhanced even when an image with a large amount of toner is formed on an uneven recording medium at a high speed, and the bleeding property of the release agent is enhanced. Therefore, image omission is further suppressed.

Here, the amorphous resin is a resin that shows only a stepwise endothermic change without having a clear endothermic peak in the thermal analysis measurement using differential scanning calorimetry (DSC), and is a solid at room temperature and thermoplasticized at a temperature higher than or equal to the glass transition temperature.

In addition, the crystalline resin indicates a resin having a clear endothermic peak without showing a stepwise change in endothermic amount in differential scanning calorimetry (DSC).

Specifically, for example, the crystalline resin means that the half-width of the endothermic peak which is measured at a temperature increasing rate of 10° C./min is 10° C. or lower, and the amorphous resin means a resin having a half-width of higher than 10° C. or a resin in which a clear endothermic peak is not observed.

The amorphous resin will be described.

Examples of the amorphous resin include known amorphous resins such as an amorphous polyester resin, an amorphous vinyl resin (such as a styrene acrylic resin), an epoxy resin, a polycarbonate resin, and a polyurethane resin. Among the examples, for example, an amorphous polyester resin or an amorphous vinyl resin (particularly a styrene acrylic resin) is preferable, and an amorphous polyester resin is more preferable.

Further, a combination of an amorphous polyester resin and a styrene acrylic resin is also a preferable aspect of the amorphous resin. Further, application of an amorphous resin having an amorphous polyester resin segment and a styrene acrylic resin segment is also a preferable aspect of the amorphous resin.

In particular, in a case where an amorphous resin having an amorphous polyester resin segment and a styrene acrylic resin segment is applied as the amorphous resin, since the resin is easily compatible with an ester-based release agent, the toner meltability is more excellent in a case where the resin shown on the left is bonded via an ester bond, and image omission is further suppressed when an image with a large amount of toner is formed on an uneven recording medium at a high speed.

Amorphous Polyester Resin

Examples of the amorphous polyester resin include a condensed polymer of a polyvalent carboxylic acid and a polyhydric alcohol. As the amorphous polyester resin, a commercially available product or a synthesized product may be used.

Examples of the polyvalent carboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid), an aromatic dicarboxylic acid (for example, terephthalic acid, isophthalic acid, phthalic acid, or naphthalenedicarboxylic acid), an anhydride thereof, and lower (for example, having 1 or more and 5 or less carbon atoms) alkyl ester thereof. Among the examples, for example, an aromatic dicarboxylic acid is preferable as the polyvalent carboxylic acid.

As the polyvalent carboxylic acid, a combination of a dicarboxylic acid with a trivalent or higher valent carboxylic acid having a crosslinked structure or a branched structure may be used. Examples of the trivalent or higher valent carboxylic acid include trimellitic acid, pyromellitic acid, an anhydride thereof, and lower (for example, having 1 or more and 5 or less carbon atoms) alkyl ester thereof.

The polyvalent carboxylic acid may be used alone or in combination of two or more kinds thereof.

Examples of the polyhydric alcohol include an aliphatic diol (such as ethylene glycol, diethylene glycol, triethylene glycol, propylene glycol, butanediol, hexanediol, or neopentyl glycol), an alicyclic diol (such as cyclohexanediol, cyclohexanedimethanol, or hydrogenated bisphenol A) and an aromatic diol (such as an ethylene oxide adduct of bisphenol A or a propylene oxide adduct of bisphenol A). Among the examples, as the polyhydric alcohol, for example, an aromatic diol or an alicyclic diol is preferable, and an aromatic diol is more preferable.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolpropane, and pentaerythritol.

The polyhydric alcohol may be used alone or in combination of two or more kinds thereof.

The amorphous polyester resin is obtained by a known production method. Specifically, for example, the amorphous polyester resin is obtained by a method of setting the polymerization temperature to 180° C. or higher and 230° C. or lower, reducing the pressure inside the reaction system as necessary, and carrying out the reaction while removing water and alcohol generated during condensation. In a case where the raw material monomer is not dissolved or compatible at the reaction temperature, a solvent having a high boiling point may be added as a dissolution assistant to dissolve the monomer. In this case, the polycondensation reaction is carried out while the dissolution assistant is distilled off. In a case where a monomer with poor compatibility is present in the copolymerization reaction, for example, the monomer with poor compatibility may be condensed with an acid or an alcohol to be polycondensed with the monomer in advance, and then polycondensed with the main component.

Examples of the amorphous polyester resin include a modified amorphous polyester resin in addition to an unmodified amorphous polyester resin. The modified amorphous polyester resin is an amorphous polyester resin in which a bonding group other than an ester bond is present, or an amorphous polyester resin in which a resin component different from polyester is bonded by a covalent bond or an ionic bond. Examples of the modified amorphous polyester resin include a resin having a terminal modified by reacting an amorphous polyester resin obtained by introducing a functional group such as an isocyanate group to the terminal with an active hydrogen compound.

The proportion of the amorphous polyester resin in all the binder resins is, for example, preferably 60% by mass or greater and 98% by mass or less, more preferably 65% by mass or greater and 95% by mass or less, and still more preferably 70% by mass or greater and 90% by mass or less.

Styrene Acrylic Resin

The styrene acrylic resin is a copolymer obtained by copolymerizing at least a styrene-based monomer (a monomer having a styrene skeleton) and a (meth)acrylic monomer (a monomer containing a (meth)acrylic group and, for example, preferably a monomer containing a (meth)acryloxy group). The styrene acrylic resin includes, for example, a copolymer of a monomer of styrenes and a monomer of (meth)acrylic acid esters.

Further, the acrylic resin portion in the styrene acrylic resin has a partial structure obtained by polymerizing any one or both of an acrylic monomer and a methacrylic monomer. Further, "(meth)acryl" is an expression including both "acryl" and "methacryl".

Examples of the styrene-based monomer include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The styrene-based monomer may be used alone or in combination of two or more kinds thereof.

Examples of the (meth)acrylic monomer include (meth) acrylic acid, methyl (meth)acrylate, ethyl (meth)acrylate, n-propyl (meth)acrylate, isopropyl (meth)acrylate, n-butyl (meth)acrylate, isobutyl (meth) acrylate, n-hexyl (meth) acrylate, 2-ethylhexyl (meth)acrylate, lauryl (meth)acrylate, stearyl (meth) acrylate, cyclohexyl (meth) acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The (meth)acrylic monomer may be used alone or in combination of two or more kinds thereof.

The polymerization ratio of the styrene-based monomer to the (meth)acrylic monomer (styrene-based monomer:(meth) acrylic monomer) is, for example, preferably in a range of 70:30 to 95:5 on a mass basis.

The styrene acrylic resin may have a crosslinked structure. The styrene acrylic resin having a crosslinked structure can be produced by, for example, copolymerizing a styrene-based monomer, a (meth)acrylic monomer, and a crosslinkable monomer. The crosslinkable monomer is not particularly limited, but for example, a bifunctional or higher functional (meth)acrylate compound is preferable.

A method of preparing the styrene acrylic resin is not particularly limited, and for example, solution polymerization, precipitation polymerization, suspension polymerization, bulk polymerization, or emulsion polymerization is applied. A known operation (for example, a batch type, semi-continuous type, or continuous type operation) is applied to the polymerization reaction.

The proportion of the styrene acrylic resin in all the binder resins is, for example, preferably 0% by mass or greater and 20% by mass or less, more preferably 1% by mass or greater and 15% by mass or less, and still more preferably 2% by mass or greater and 10% by mass or less.

Amorphous resin having amorphous polyester resin segment and styrene acrylic resin segment (hereinafter, also referred to as "hybrid amorphous resin")

The hybrid amorphous resin is an amorphous resin in which an amorphous polyester resin segment and a styrene acrylic resin segment are chemically bonded to each other.

Examples of the hybrid amorphous resin include a resin having a main chain consisting of a polyester resin and a side chain consisting of a styrene acrylic resin chemically bonded to the main chain; a resin having a main chain consisting of a styrene acrylic resin and a side chain consisting of a polyester resin chemically bonded to the main chain; a resin having a main chain to which a polyester resin and a styrene acrylic resin are chemically bonded; and a resin having a main chain to which a polyester resin and a styrene acrylic resin are chemically bonded and at least one of a side chain consisting of a polyester resin chemically bonded to the main chain or a side chain consisting of a styrene acrylic resin chemically bonded to the main chain.

The amorphous polyester resin segment and the styrene acrylic resin segment are as described above, and the description thereof will not be provided.

The proportion of total amount of the polyester resin segment and the styrene acrylic resin segment in the entire hybrid amorphous resin is, for example, preferably 80% by mass or greater, more preferably 90% by mass or greater, still more preferably 95% by mass or greater, and even still more preferably 100% by mass.

In the hybrid amorphous resin, the proportion of the styrene acrylic resin segment in the total amount of the polyester resin segment and the styrene acrylic resin segment is, for example, preferably 20% by mass or greater and 60% by mass or less, more preferably 25% by mass or greater and 55% by mass or less, and still more preferably 30% by mass or greater and 50% by mass or less.

It is preferable that the hybrid amorphous resin is produced by, for example, any of the following methods (i) to (iii).

(i) A polyester resin segment is prepared by polycondensation of a polyhydric alcohol and a polyvalent carboxylic acid, and the monomer constituting the styrene acrylic resin segment is addition-polymerized.

(ii) A styrene acrylic resin segment is prepared by addition polymerization of an addition-polymerizable monomer, and the polyhydric alcohol and the polyvalent carboxylic acid are polycondensed.

(iii) The polycondensation of the polyhydric alcohol and the polyvalent carboxylic acid and the addition polymerization of the addition-polymerizable monomer are performed in parallel.

The proportion of the hybrid amorphous resin in all the binder resins is, for example, preferably 60% by mass or greater and 98% by mass or less, more preferably 65% by mass or greater and 95% by mass or less, and still more preferably 70% by mass or greater and 90% by mass or less.

The characteristics of the amorphous resin will be described.

The glass transition temperature (Tg) of the amorphous resin is, for example, preferably 50° C. or higher and 80° C. or lower and more preferably 50° C. or higher and 65° C. or lower.

Further, the glass transition temperature is acquired from the DSC curve obtained by differential scanning calorimetry (DSC) and more specifically acquired by the "extrapolated glass transition start temperature" described in the method of acquiring the glass transition temperature in JIS K 7121-1987 "Method of measuring transition temperature of plastics".

The weight-average-molecular weight (Mw) of the amorphous resin is, for example, preferably 5000 or greater and 1000000 or less and more preferably 7000 or greater and 500000 or less.

The number average molecular weight (Mn) of the amorphous resin is, for example, preferably 2000 or greater and 100000 or less.

The molecular weight distribution Mw/Mn of the amorphous resin is, for example, preferably 1.5 or greater and 100 or less and more preferably 2 or greater and 60 or less.

Further, the weight-average-molecular weight and the number average molecular weight are measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average-molecular weight and the number average molecular weight are calculated using a molecular weight calibration curve created by a monodisperse polystyrene standard sample based on the measurement results.

The crystalline resin will be described.

Examples of the crystalline resin include known crystalline resins such as a crystalline polyester resin and a crystalline vinyl resin (for example, a polyalkylene resin or a long-chain alkyl (meth)acrylate resin). Among the examples, a crystalline polyester resin is preferable from the viewpoints of the mechanical strength and the low-temperature fixability of the toner.

Crystalline Polyester Resin

Examples of the crystalline polyester resin include a polycondensate of a polyvalent carboxylic acid and a polyhydric alcohol. As the crystalline polyester resin, a commercially available product or a synthesized product may be used.

Since the crystalline polyester resin easily forms a crystal structure, for example, a polycondensate obtained by using a linear aliphatic polymerizable monomer is preferable to a polymerizable monomer having an aromatic ring.

Examples of the polyvalent carboxylic acid include an aliphatic dicarboxylic acid (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid), an aromatic dicarboxylic acid (for example, a dibasic acid such as phthalic acid, isophthalic acid, terephthalic acid, or naphthalene-2,6-dicarboxylic acid), an anhydride thereof, and lower (for example, having 1 or more and 5 or less carbon atoms) alkyl ester thereof.

As the polyvalent carboxylic acid, a combination of a dicarboxylic acid with a trivalent or higher valent carboxylic acid having a crosslinked structure or a branched structure may be used. Examples of the trivalent carboxylic acid include an aromatic carboxylic acid (for example, 1,2,3-benzenetricarboxylic acid, 1,2,4-benzenetricarboxylic acid, or 1,2,4-naphthalenetricarboxylic acid), an anhydride thereof, and lower (for example, having 1 or more and 5 or less carbon atoms) alkyl ester thereof.

As the polyvalent carboxylic acid, a combination of such dicarboxylic acids with a dicarboxylic acid containing a sulfonic acid group and a dicarboxylic acid having an ethylenic double bond may be used.

The polyvalent carboxylic acid may be used alone or in combination of two or more kinds thereof.

Examples of the polyhydric alcohol include an aliphatic diol (for example, a linear aliphatic diol having a main chain portion with 7 or more and 20 or less carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the examples, for example, 1,8-octanediol, 1,9-nonanediol, or 1,10-decanediol is preferable as the aliphatic diol.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolethane, trimethylolpropane, and pentaerythritol.

The polyhydric alcohol may be used alone or in combination of two or more kinds thereof.

As the polyhydric alcohol, the content of the aliphatic diol may be set to, for example, 80% by mole or greater and preferably 90% by mole or greater.

The crystalline polyester resin can be obtained by, for example, a known production method similar to the amorphous polyester resin.

As the crystalline polyester resin, for example, a polymer of α,ω-linear aliphatic dicarboxylic acid and α,ω-linear aliphatic diol is preferable.

Since the polymer of α,ω-linear aliphatic dicarboxylic acid and α,ω-linear aliphatic diol is highly compatible with the amorphous polyester resin, the meltability of the toner during fixation is enhanced even when an image with a large amount of toner is formed on an uneven recording medium at a high speed, and the bleeding property of the release agent is enhanced. Therefore, image omission is further suppressed.

As the α,ω-linear aliphatic dicarboxylic acid, for example, α,ω-linear aliphatic dicarboxylic acid in which the number of carbon atoms of an alkylene group connecting two carboxy groups is 3 or greater and 14 or less is preferable, the number of carbon atoms of the alkylene group is more preferably 4 or greater and 12 or less, and the number of carbon atoms of the alkylene group is still more preferably 6 or greater and 10 or less.

Examples of the α,ω-linear aliphatic dicarboxylic acid include succinic acid, glutaric acid, adipic acid, 1,6-hexanedicarboxylic acid (common name, suberic acid), 1,7-heptanedicarboxylic acid (common name, azelaic acid), 1,8-octanedicarboxylic acid (common name, sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among the examples, for example, 1,6-hexanedicarboxylic acid, 1,7-heptanedicarboxylic acid, 1,8-octanedicarboxylic acid, 1,9-nonanedicarboxylic acid, or 1,10-decanedicarboxylic acid is preferable.

The α,ω-linear aliphatic dicarboxylic acid may be used alone or in combination of two or more kinds thereof.

As the α,ω-linear aliphatic diol, for example, α,ω-linear aliphatic diol in which the number of carbon atoms of an alkylene group connecting two hydroxy groups is 3 or greater and 14 or less is preferable, the number of carbon atoms of the alkylene group is more preferably 4 or greater and 12 or less, and the number of carbon atoms of the alkylene group is still more preferably 6 or greater and 10 or less.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among the examples, for example, 1,6-hexanediol, 1,7-heptanediol, 1,8-octanediol, 1,9-nonanediol, or 1,10-decanediol is preferable.

The α,ω-linear aliphatic diol may be used alone or in combination of two or more kinds thereof.

As the polymer of the α,ω-linear aliphatic dicarboxylic acid and the α,ω-linear aliphatic diol, from the viewpoint of suppressing image omission, for example, a polymer of at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol is preferable. Among the examples, for example, a polymer of 1,10-decanedicarboxylic acid and 1,6-hexanediol is more preferable.

The proportion of the crystalline polyester resin in all the binder resins is, for example, preferably 1% by mass or greater and 20% by mass or less, more preferably 2% by mass or greater and 15% by mass or less, and still more preferably 3% by mass or greater and 10% by mass or less.

The characteristics of the crystalline resin will be described.

The melting temperature of the crystalline resin is, for example, preferably 50° C. or higher and 100° C. or lower, more preferably 55° C. or higher and 90° C. or lower, and still more preferably 60° C. or higher and 85° C. or lower.

Further, the melting temperature is acquired from the DSC curve obtained by differential scanning calorimetry (DSC) according to the "melting peak temperature" described in the method of acquiring the melting temperature in JIS K7121-1987 "Method of measuring transition temperature of plastics".

The weight-average-molecular weight (Mw) of the crystalline resin is, for example, preferably 6,000 or greater and 35,000 or less.

The content of the binder resin is, for example, preferably 40% by mass or greater and 95% by mass or less, more preferably 50% by mass or greater and 90% by mass or less, and still more preferably 60% by mass or greater and 85% by mass or less with respect to the entirety of the toner particles.

Release Agent

Examples of the release agent include hydrocarbon-based wax; natural wax such as carnauba wax, rice wax, or candelilla wax; synthetic or mineral/petroleum wax such as montan wax; and ester-based wax such as fatty acid ester or montanic acid ester. The release agent is not limited thereto.

The melting temperature of the release agent is, for example, preferably 50° C. or higher and 110° C. or lower and more preferably 60° C. or higher and 100° C. or lower.

The melting temperature of the release agent is acquired from the DSC curve obtained by differential scanning calorimetry (DSC) according to the "melting peak temperature" described in the method of acquiring the melting temperature in JIS K7121:1987 "Method of measuring transition temperature of plastics".

In particular, the melting temperature of the release agent is, for example, preferably 65° C. or higher and 85° C. or lower. In a case where a release agent having a melting temperature of 65° C. or higher and 85° C. or lower is applied, the domain of the release agent is easily increased in diameter and spheroidized, the domain diameter of the release agent is easily controlled to be in the above-described range, and the circularity of the domain of the release agent is easily controlled to be in the above-described range.

Further, as the release agent, for example, an ester-based wax is preferable. With the ester-based wax, the domain of the release agent is more easily spheroidized and the circularity of the domain of the release agent is more easily controlled to be in the above-described range as compared to a paraffin-based wax.

The ester-based wax is a wax having an ester bond. The ester-based wax may be any of a monoester, a diester, a triester, or a tetraester, and a known natural or synthetic ester-based wax can be employed.

Examples of the ester-based wax include an ester compound of a higher fatty acid (a fatty acid having 10 or more carbon atoms) and a monohydric or polyhydric aliphatic alcohol (an aliphatic alcohol having 8 or more carbon atoms).

Examples of the ester wax include an ester compound of a higher fatty acid (caprylic acid, capric acid, lauric acid, myristic acid, palmitic acid, stearic acid, arachidic acid, behenic acid, or oleic acid) and an alcohol (a monohydric alcohol such as methanol, ethanol, propanol, isopropanol, butanol, capryl alcohol, lauryl alcohol, myristyl alcohol, cetyl alcohol, stearyl alcohol, or oleyl alcohols; or a polyhydric alcohol such as glycerin, ethylene glycol, propylene glycol, sorbitol, or pentaerythritol). Specific examples the ester-based wax include carnauba wax, rice wax, candelilla wax, jojoba oil, wood wax, beeswax, insect wax, lanolin, and montanic acid ester wax.

The content of the release agent is, for example, preferably 1% by mass or greater and 20% by mass or less and more preferably 5% by mass or greater and 15% by mass or less with respect to the entirety of the toner particles.

Divalent Metal

Examples of the divalent metal include calcium (Ca), magnesium (Mg), barium (Ba), zinc (Zn), copper (Cu), and manganese (Mn).

Among the examples, from the viewpoint of the aggregating properties of the molecular chains of the binder resin, it is preferable that the divalent metal is, for example, at least one selected from the group consisting of Ca and Mg.

It is preferable that the divalent metal is, for example, introduced into the toner particles by using an inorganic metal salt.

From the viewpoint of efficiently aggregating the molecular chains of the binder resin, the content of the divalent metal is, for example, preferably 0.5 mmol or greater and 50 mmol or less, more preferably 1.0 mmol or greater and 40 mmol or less, and still more preferably 1.0 mmol or greater and 30 mmol or less per 1 kg of the toner particles.

Trivalent Metal

Examples of the trivalent metal include aluminum (Al) and iron (Fe).

Among the examples, from the viewpoint of easily forming a three-dimensional crosslinked structure as an aggregate of the molecular chains of the binder resin, for example, Al is preferable.

It is preferable that the trivalent metal is, for example, introduced into the toner particles by using an inorganic metal salt.

From the viewpoint of easily forming a three-dimensional crosslinked structure as an aggregate of the molecular chains of the binder resin, the content of the trivalent metal is, for example, 0.5 mmol or greater and 50 mmol or less, more preferably 1.0 mmol or greater and 40 mmol or less, and still more preferably 1.0 mmol or greater and 30 mmol or less per 1 kg of the toner particles.

In the toner according to the exemplary embodiment of the present disclosure, from the viewpoint of obtaining an image with further suppressed gloss unevenness, for example, it is preferable that the content of the divalent metal with respect to the mass of the toner particles is 0.5 mmol/kg or greater and 50 mmol/kg or less (for example, preferably 1.0 mmol/kg or greater and 30 mmol/kg or less) and the content of the trivalent metal with respect to the mass of the toner particles is 0.5 mmol/kg or greater and 50 mmol/kg or less (for example, preferably 1.0 mmol/kg or greater and 30 mmol/kg or less).

Here, the content of the divalent or trivalent metal with respect to the mass of the toner particles is the content of the divalent or trivalent metal per 1 kg of the toner particles (unit: mmol).

In the toner according to the exemplary embodiment of the present disclosure, the ratio of the content of the divalent metal to the content of the trivalent metal (content mol number of divalent metal/content mol number of trivalent metal) is, for example, preferably 0.3 or greater and 10 or less, more preferably 1.0 or greater and 10 or less, and still more preferably 1.0 or greater and 5.0 or less.

Here, a method of measuring the content of the trivalent metal and the content of the divalent metal will be described.

The content of the metal elements in the entirety of the toner particles is acquired by quantitative analysis of the fluorescent X-ray intensity.

Specifically, for example, first, the mass of approximately 200 mg of a mixture of a polyester resin having a known concentration and an aggregating agent containing metal elements to be measured is precisely weighed as a pellet sample using an IR tablet molding machine having a diameter of 13 mm, and the peak intensity is acquired by measuring the fluorescent X-ray intensity of the pellet sample. Similarly, a sample in which the addition amount of the aggregating agent containing the metal elements has been changed is also measured, the calibration curve is created based on such results, the content of the metal elements in the actual measurement sample (that is, the toner particles to be measured) is quantitatively analyzed using this calibration curve, and the content of the metal elements can be calculated for each sample in units of mmol/kg.

The fluorescent X-ray intensity is measured using, for example, a fluorescent X-ray analyzer (XRF-1500, manufactured by Shimadzu Corporation) under the conditions of an X-ray output of 40 V to 70 mA, a measurement area of 10 mmφ, and a measurement time of 15 minutes. Further, in a case where the peaks of other elements overlap with this peak, the intensity of the metal element may be acquired after analysis according to ICP emission spectroscopy or an atomic absorption method.

Further, it is preferable that the toner according to the exemplary embodiment of the present invention contains, for example, 50% or greater of the trivalent metal in terms of mol number (for example, preferably 60% or greater in terms of mol number) in a region of the toner particle to a depth of 300 nm from the surface and contains 60% or greater of the divalent metal in terms of mol number (for example, preferably 70% or greater in terms of mol number) inside a region of the toner particle to a depth of 300 μm from the surface.

That is, it is preferable that the toner particles contained in the toner according to the exemplary embodiment of the present disclosure contain, for example, a large amount of the trivalent metal in the surface layer portion (that is, the region to a depth of 300 nm from the surface) and a large amount of the divalent metal inside the surface layer portion (that is, inside the region to a depth of 300 nm from the surface).

Here, a method of acquiring the content of the trivalent metal in the region to a depth of 300 nm from the surface and the content of the divalent metal inside the region to a depth of 300 nm from the surface will be described.

The content of the metal elements contained in the region to a depth of 300 nm from the surface is acquired by analyzing the surface composition according to X-ray photoelectron spectroscopic analysis (ESCA) and is calculated based on this result.

The device and measurement conditions for ESCA are as follows.

Device to be used: 1600S type X-ray photoelectron analyzer, manufactured by PHI (Physical Electronics Industries, Inc.)

Measurement conditions: X-ray source MgKα (400 W)

Spectroscopic region: 800 μm in diameter

The atomic concentration (atomic %) near the surface is calculated using the relative sensitivity factor provided by PHI based on the peak intensity of each element measured by the above-described analysis. The content of the metal element in the region to a depth of 300 nm from the surface of the toner particle is measured by sputtering the surface of the toner particle with an Ar ion beam in the depth direction. Further, the depth from the surface of the toner particle is measured by performing observation using a transmission electron microscope after the sputtering treatment with an Ar ion beam.

The content of the metal element in the range to a depth of 300 nm from the surface of the toner particle is calculated by measuring the atomic % of a known sample in advance, creating the calibration curve, and calculating the content of the metal element in an actual measurement sample (that is, the toner particle to be measured) based on the calibration curve.

The content of the trivalent metal in the range to a depth of 300 nm from the surface of the toner particle and the content of the divalent metal inside the region to a depth of 300 nm from the surface are acquired based on the calculated content of the metal element in the region to a depth of 300 nm from the surface of the toner particle and the content of the metal elements in the entirety of the toner particles measured by the above-described method.

Colorant

Examples of other colorants include pigments such as Carbon Black, Chrome Yellow, Hansa Yellow, Benzidine Yellow, Suren Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, Dupont Oil Red, Pyrazolon Red, Lithol Red, Rhodamin B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

Such colorants may be used alone or in combination of two or more kinds thereof.

As the colorant, a surface-treated colorant may be used as necessary, or a combination with a dispersant may be used. Further, a plurality of kinds of colorants may be used in combination.

The content of the colorant is, for example, preferably 1% by mass or greater and 30% by mass or less and more preferably 3% by mass or greater and 15% by mass or less with respect to the entirety of the toner particles.

Other Additives

Examples of other additives include known additives such as a magnetic material, a charge control agent, and inorganic powder. Such additives are contained in the toner particles as internal additives.

Characteristics and the Like of Toner Particles

The toner particles may be toner particles having a single layer structure or toner particles having a so-called core-shell structure formed of a core portion (core particle) and a coating layer (shell layer) covering the core portion.

Here, the toner particles having a core-shell structure may be formed of, for example, a core portion containing a binder resin and, as necessary, other additives such as a colorant and a release agent, and a coating layer containing a binder resin.

The volume average particle diameter (D50v) of the toner particles is, for example, preferably 2 μm or greater and 15 μm or less and more preferably 4 μm or greater and 8 μm or less.

Further, various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5% aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in a range of 2 μm or greater and 60 μm or less is measured by a Coulter Multisizer II using an aperture of 100 μm as the aperture diameter. Further, the number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter) [(perimeter of circle having same projected area as particle image)/(perimeter of projected particle image)].

Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

Further, in a case where the toner has an external additive, the toner (developer) to be measured is dispersed in water containing a surfactant, and an ultrasonic treatment is performed, thereby obtaining toner particles from which the external additive has been removed.

In the toner according to the exemplary embodiment of the present disclosure, the gel fraction of the binder resin in the toner particles is, for example, preferably 1% by mass or greater and 10% by mass or less and more preferably 2% by mass or greater and 6% by mass or less.

The gel content of the binder resin is generated by three-dimensional crosslinking of the binder resin, and the gel fraction of the binder resin indicates the proportion of the three-dimensional crosslinked structure in the total amount of the binder resin.

In a case where the gel fraction of the binder resin is in the above-described range, the elasticity of the toner particles is increased due to the presence of the three-dimensional crosslinked structure, and an image with further suppressed gloss unevenness is obtained.

Here, the gel fraction of the binder resin is acquired as follows.

In a case where an external additive is added to the toner particles to be measured, the external additive is first removed by a known method such as a method of applying ultrasonic vibration in a liquid to obtain toner particles.

Next, the toner particles are added to an Erlenmeyer flask, tetrahydrofuran (THF) heated to 45° C. is added thereto, the flask is sealed, and the mixture is allowed to stand for 24 hours. Here, for example, a constant-temperature tank capable of maintaining 45° C. may be used here. Thereafter, all the contents of the Erlenmeyer flask are transferred to a glass tube for centrifugation, and centrifugation is performed for 30 minutes under the conditions of a rotation speed of 20,000 rpm (revolutions per minute) and −10° C. After the centrifugation, all the contents are taken out and allowed to stand in the constant-temperature tank at 45° C., and the supernatant which is a THF-dissolved portion and the THF-insoluble component which is a precipitate at 45° C. are separated from each other. Next, the amount of the THF-dissolved resin is measured by drying the supernatant.

Next, the release agent is initially volatilized and the solid content (that is, a gel-like resin component) derived from the resin component is thermally decomposed, by heating the obtained THF-insoluble component at 45° C. to 600° C. at a temperature increasing rate of 20° C./min under a nitrogen gas stream. The remaining components are mainly pigment-derived components and other trace amounts of additives (such as solid contents derived from inorganic components). The amount of gel derived from the resin component as the THF-insoluble component at 45° C. is measured by removing the pigment, the release agent, and the like in the toner particles from the above-described proportion.

Further, the gel fraction of the binder resin in the toner particles is calculated as follows.

Gel fraction of binder resin(% by mass)=amount of gel derived from resin component(amount of gel derived from resin component+amount of THF-dissolved resin)×100

Further, from the viewpoint of obtaining an image with further suppressed gloss unevenness, in the toner particles, for example, the content of the divalent metal with respect to the mass of the gel content of the binder resin is preferably 10 mmol/kg or greater and 50 mmol/kg or less (for example, preferably 30 mmol/kg or greater and 50 mmol/kg or less) and the content of the trivalent metal with respect to the mass of the gel content of the binder resin is preferably 20 mmol/kg or greater and 150 mmol/kg or less (for example, preferably 50 mmol/kg or greater and 150 mmol/kg or less).

The content of the divalent or trivalent metal with respect to the mass of the gel content of the binder resin is measured by the following method.

Specifically, for example, first, the mass of approximately 200 mg of a mixture of a polyester resin having a known concentration and an aggregating agent containing metal elements to be measured is precisely weighed as a pellet sample using an IR tablet molding machine having a diameter of 13 mm, and the peak intensity is acquired by measuring the fluorescent X-ray intensity of the pellet sample. Similarly, a sample in which the addition amount of the aggregating agent containing the metal elements has been changed is also measured, the calibration curve is created based on the results, the measurement of the fluorescent X-ray intensity is performed on the gel content of the actual binder resin using the calibration curve, the content of the metal elements is quantitatively analyzed, and the content of the metal elements can be calculated for each sample in units of mmol/kg.

The fluorescent X-ray intensity is measured using, for example, a fluorescent X-ray analyzer (XRF-1500, manufactured by Shimadzu Corporation) under the conditions of an X-ray output of 40 V to 70 mA, a measurement area of 10 mmφ, and a measurement time of 15 minutes. Further, in a case where the peaks of other elements overlap with this peak, the intensity of the metal element may be acquired after analysis according to ICP emission spectroscopy or an atomic absorption method.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the inorganic particle serving as the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. The hydrophobic treatment agents may be used alone or in combination of two or more kinds thereof.

The amount of the hydrophobic treatment agent is, for example, typically 1 part by mass or greater and 10 parts by mass or less with respect to 100 parts by mass of the inorganic particles.

Examples of external additives also include resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like.

The amount of the external additive is, for example, preferably 0.01% by mass or greater and 5% by mass or less and more preferably 0.01% by mass or greater and 2.0% by mass or less with respect to the total mass of the toner particles.

Method of Producing Toner

Next, a method of producing the toner according to the exemplary embodiment of the present disclosure will be described.

The toner according to the exemplary embodiment of the present disclosure can be obtained by externally adding the external additive to the toner particles after the production of the toner particles.

The toner particles may be produced by any of a dry production method (for example, a kneading and pulverizing method) or a wet production method (for example, an aggregation and coalescence method, a suspension polymerization method, or a dissolution suspension method). The method of producing the toner particles is not particularly limited to such production methods, and a well-known production method is employed.

Among the examples, from the viewpoint of increasing the domain diameter of the release agent and increasing the elasticity of the toner particles, for example, the toner particles may be obtained by the aggregation and coalescence method.

Specifically, for example, in a case where the toner particles are produced by the aggregation and coalescence method, the toner particles are produced by performing a step of preparing a resin particle dispersion liquid in which resin particles are dispersed and a release agent particle dispersion liquid in which release agent particles are dispersed (particle dispersion liquid preparation step), a step of allowing the resin particles the release agent (a colorant as necessary) to be aggregated in the mixed dispersion liquid of the resin particle dispersion liquid and the release agent particle dispersion liquid (a mixed dispersion liquid in which a colorant dispersion liquid has been mixed as necessary) using a first aggregating agent to form first aggregated particles (first aggregated particle formation step), a step of mixing an aggregated particle dispersion liquid in which the first aggregated particles are dispersed, the resin particle dispersion liquid, and the release agent particle dispersion liquid (or mixing the aggregated particle dispersion liquid with a mixed solution of the resin particle dispersion liquid and the release agent particle dispersion liquid) after the aggregated particle dispersion liquid is obtained and repeatedly performing an operation of carrying out aggregation once or more times using a second aggregating agent such that the resin particles and the release agent particles are further attached to the surfaces of the first aggregated particles to form second aggregated particles (second aggregated particle formation step), a step of mixing an aggregated particle dispersion liquid in which the second aggregated particles are dispersed with the resin particle dispersion liquid after the aggregated particle dispersion liquid is obtained and carrying out aggregation such that the resin particles are attached to the surfaces of the second aggregated particles using a third aggregating agent to form third aggregated particles (third aggregated particle formation step), and a step of heating an aggregated particle dispersion liquid in which the third aggregated particles are dispersed and fusing and coalescing the third aggregated particles to form toner particles (fusion and coalescence step).

In the above-described steps, a three-dimensional cross-linked structure of the binder resin is easily formed without impairing an increase in domain diameter of the release agent by using an aggregating agent containing a divalent metal as the first aggregating agent and further using an aggregating agent containing a trivalent metal as the second aggregating agent.

According to this method, the toner particles contained in the toner according to the exemplary embodiment of the present disclosure can be easily produced.

Further, an increase in size of the domain of the release agent is attempted by holding the release agent at a temperature higher than or equal to the melting temperature of the release agent in the fusion and coalescence step. In this case, any combination of an aggregating agent containing the divalent metal and an aggregating agent containing the trivalent metal may be used as the first aggregating agent and the second aggregating agent. For example, an aggregating agent containing a trivalent metal may be used as the first aggregating agent and an aggregating agent containing a divalent metal may be used as the second aggregating agent, or a combination of an aggregating agent containing a divalent metal and an aggregating agent containing a trivalent metal may be used as at least one of the first aggregating agent or the second aggregating agent.

Further, since a release agent particle dispersant is not used in the third aggregated particle formation step, the coating property due to the resin particles is improved, and the exposure of the release agent from the surface of the toner particle is suppressed.

The details of each step will be described below.

In the description below, a method of obtaining toner particles containing a colorant and a release agent will be described, but the colorant is used as necessary. It is needless to say that additives other than the colorant may be used.

Resin Particle Dispersion Liquid Preparation Step

First, for example, a colorant particle dispersion liquid in which the colorant particles are dispersed and a release agent particle dispersion liquid in which the release agent particles are dispersed are prepared together with each resin particle dispersion liquid (an amorphous resin particle dispersion liquid and a crystalline resin particle dispersion liquid) in which the resin particles serving as the binder resin are dispersed.

Here, the resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Further, depending on the kind of resin particles, the resin particles may be dispersed in a resin particle dispersion liquid by a phase inversion emulsification method.

Further, the phase inversion emulsification method is a method of dissolving the resin to be dispersed in a hydrophobic organic solvent in which the resin is soluble, adding a base to an organic continuous phase (O phase) for neutralization, adding an aqueous medium (W phase) thereto, performing conversion of the resin (so-called phase inversion) from W/O to O/W to obtain a discontinuous phase, and dispersing the resin in the aqueous medium in the form of particles.

The volume average particle diameter of the resin particles to be dispersed in the resin particle dispersion liquid is, for example, preferably 0.01 μm or greater and 1 μm or less, more preferably 0.08 μm or greater and 0.8 μm or less, and still more preferably 0.1 μm or greater and 0.6 μm or less.

Further, the volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

In addition, similar to the resin particle dispersion liquid, for example, the colorant particle dispersion liquid and the release agent particle dispersion liquid are also prepared. That is, the same applies to the colorant particles to be dispersed in the colorant particle dispersion liquid and the release agent particles to be dispersed in the release agent particle dispersion liquid in terms of the volume average particle diameter of particles in the resin particle dispersion liquid, the dispersion medium, the dispersion method, and the content of the particles.

First Aggregated Particle Formation Step

Next, the resin particle dispersion liquid, the colorant particle dispersion liquid, and the release agent particle dispersion liquid are mixed.

Further, the resin particles, the release agent particles, and the colorant particles are heteroaggregated in the mixed dispersion liquid to form first aggregated particles including the resin particles, the release agent particles, and the colorant particles, which have a diameter close to the diameter of the target toner particles.

Specifically, for example, the first aggregated particles are formed by adding the first aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to the glass transition temperature of the resin particles (specifically, for example, the glass transition temperature of the resin particles—30° C. or greater and the glass transition temperature of the resin particles—10° C. or lower) and allowing the particles dispersed in the mixed dispersion liquid to be aggregated.

In the first aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the first aggregating agent include a surfactant having a polarity opposite to the polarity of the surfactant used as a dispersant to be added to the mixed dispersion liquid, an inorganic metal salt, and a divalent or higher valent metal complex. Particularly, in a case where a metal complex is used as the first aggregating agent, the amount of the surfactant to be used is reduced, and the charging characteristics are improved.

An additive that forms a complex or a bond similar to the complex with a metal ion of the aggregating agent may be used as necessary. A chelating agent is used as the additive.

Examples of the inorganic metal salt serving as the first aggregating agent include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide. Among the examples, as the first aggregating agent, for example, an aggregating agent containing a divalent metal is preferable, and specifically, for example, calcium chloride, calcium nitrate, barium chloride, or magnesium chloride is preferable, calcium chloride, barium chloride, or magnesium chloride is more preferable, and magnesium chloride is particularly preferable.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The addition amount of the chelating agent is, for example, preferably 0.01 parts by mass or greater and 5.0 parts by mass or less and more preferably 0.1 parts by mass or greater and less than 3.0 parts by mass with respect to 100 parts by mass of the amorphous resin particles.

Second Aggregated Particle Formation Step

Next, the aggregated particle dispersion liquid in which the first aggregated particles are dispersed is obtained, and the aggregated particle dispersion liquid, the resin particle dispersion liquid, and the release agent resin particle dispersion liquid are mixed. The aggregated particle dispersion liquid may be mixed with a mixed solution of the resin particle dispersion liquid and the release agent resin particle dispersion liquid.

Further, the resin particles and the release agent resin particles are aggregated on the surface of the first aggregated particles in the dispersion liquid in which the first aggregated particles, the resin particles, and the release agent resin particles are dispersed.

Specifically, for example, the resin particle dispersion liquid and the release agent resin particle dispersion liquid are added to the first aggregated particle dispersion liquid when the particle diameter of the first aggregated particles reaches the target particle diameter, the second aggregating agent is added to the dispersion liquid, and the dispersion liquid is heated to a temperature lower than or equal to the glass transition temperature of the resin particles in the first aggregated particle formation step. This aggregation operation is repeatedly performed once or more times to form second aggregated particles.

As the second aggregating agent used in the present step, the same aggregating agent as the above-described first aggregating agent can be used. Among the examples, as the second aggregating agent, for example, an aggregating agent containing a trivalent metal is preferable, and specifically, for example, aluminum chloride, aluminum sulfate, polyaluminum chloride, polyaluminum hydroxide, or ferric chloride is preferable, and polyaluminum chloride is particularly preferable.

Third Aggregated Particle Formation Step

After the aggregated particle dispersion liquid in which the second aggregated particles are dispersed is obtained, the aggregated particle dispersion liquid is mixed with the resin particle dispersion liquid.

Further, the resin particles are aggregated on the surface of the second aggregated particles in the dispersion liquid in which the second aggregated particles and the resin particles are dispersed.

Specifically, for example, the resin particle dispersion liquid is added to the second aggregated particle dispersion liquid when the particle diameter of the second aggregated particles reaches the target particle diameter, the third aggregating agent is added to the dispersion liquid, and the dispersion liquid is heated at a temperature lower than or equal to the glass transition temperature of the resin particles in the third aggregated particle formation step.

In addition, the pH of the dispersion liquid is adjusted to stop the progress of aggregation.

As the third aggregating agent used in the present step, the same aggregating agent as the second aggregating agent used in the second aggregated particle formation step is used, and the preferable exemplary embodiments are also the same as described above.

Fusion and Coalescence Step

Next, the third aggregated particle dispersion liquid in which the third aggregated particles are dispersed is heated to, for example, a temperature higher than or equal to the glass transition temperature of the resin particles (for example, a temperature higher than the glass transition temperature of the resin particles by 10° C. to 30° C.) and the aggregated particles are fused and coalesced, thereby forming toner particles.

After completion of the fusion and coalescence step, toner particles in a dry state are obtained by performing a known cleaning step, a known solid-liquid separation step, and a known drying step on the toner particles formed in the solution.

From the viewpoint of the charging properties, for example, displacement cleaning may be sufficiently performed as the cleaning step using ion exchange water. The solid-liquid separation step is not particularly limited, but suction filtration, pressure filtration, or the like may be performed from the viewpoint of productivity. The drying step is not particularly limited, and from the viewpoint of the productivity, for example, freeze-drying, flush drying, fluidized drying, vibratory fluidized drying, or the like may be performed as the drying step.

Further, the toner according to the exemplary embodiment of the present disclosure is produced by, for example, adding an external additive to the obtained toner particles in a dry state and mixing the external additive with the toner particles. The mixing may be performed, for example, using a V blender, a Henschel mixer, a Lodige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the toner according to the exemplary embodiment of the present disclosure.

The electrostatic charge image developer according to the present exemplary embodiment may be a one-component developer which contains only the toner according to the exemplary embodiment of the present disclosure or a two-component developer obtained by mixing the toner and a carrier.

The carrier is not particularly limited, and examples thereof include known carriers. Examples of the carrier include a coated carrier obtained by coating the surface of a core material consisting of magnetic powder with a coating resin, a magnetic powder dispersion type carrier obtained by dispersing magnetic powder in a matrix resin so as to be blended, and a resin impregnation type carrier obtained by impregnating porous magnetic powder with a resin.

Further, each of the magnetic powder dispersion type carrier and the resin impregnation type carrier may be a carrier obtained by coating the surface of the particle constituting the carrier, serving as a core material, with a coating resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene acrylic acid ester copolymer, a straight silicone resin formed to have an organosiloxane bond, a product obtained by modifying the straight silicone resin, a fluororesin, polyester, polycarbonate, a phenol resin, and an epoxy resin.

Further, the coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

Here, the surface of a core material is coated with a coating resin by, for example, a method of coating the surface with a solution for forming a coating layer, which is obtained by dissolving a coating resin and various additives as necessary in an appropriate solvent. The solvent is not particularly limited, and may be selected in consideration of the coating resin to be used, coating suitability, and the like.

Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

An image forming device and an image forming method according to the present exemplary embodiment will be described.

The image forming device according to the present exemplary embodiment includes an image holding member, a charging unit that charges a surface of the image holding member, an electrostatic charge image forming unit that forms an electrostatic charge image on the surface of the charged image holding member, a developing unit that accommodates an electrostatic charge image developer and develops the electrostatic charge image formed on the surface of the image holding member as a toner image by the electrostatic charge image developer, a transfer unit that transfers the toner image formed on the surface of the image holding member to a surface of a recording medium, and a fixing unit that fixes the toner image transferred to the surface of the recording medium. Further, the electrostatic charge image developer according to the present exemplary embodiment is applied as the electrostatic charge image developer.

With the image forming device according to the present exemplary embodiment, an image forming method (the image forming method according to the present exemplary embodiment) including a charging step of charging a surface of the image holding member, an electrostatic charge image formation step of forming an electrostatic charge image on the surface of the charged image holding member, a developing step of developing the electrostatic charge image formed on the surface of the image holding member as a toner image by the electrostatic charge image developer according to the present exemplary embodiment, a transfer step of transferring the toner image formed on the surface of the image holding member to a surface of a recording medium, and a fixing step of fixing the toner image transferred to the surface of the recording medium is performed.

As the image forming device according to the present exemplary embodiment, a known image forming device such as a direct transfer type device that directly transfers a toner image formed on a surface of an image holding member to a recording medium, an intermediate transfer type device that primarily transfers a toner image formed on a surface of an image holding member to a surface of an intermediate transfer member and secondarily transfers the toner image transferred to the surface of the intermediate transfer member to a surface of a recording medium, a device that includes a cleaning unit cleaning a surface of an image holding member after transfer of a toner image and before charge of the image holding member, or a device that includes an electricity removing unit removing electricity by irradiating a surface of an image holding member with electricity removing light after transfer of a toner image and before charge of the image holding member is applied.

In a case where the image forming device is the intermediate transfer type device, for example, a configuration in which the transfer unit includes an intermediate transfer member having a surface onto which a toner image is transferred, a primary transfer unit primarily transferring the toner image formed on the surface of the image holding member to the surface of the intermediate transfer member, and a secondary transfer unit secondarily transferring the toner image transferred to the surface of the intermediate transfer member to the surface of the recording medium is applied.

In the image forming device according to the present exemplary embodiment, for example, the portion including the developing unit may have a cartridge structure (process cartridge) that is detachable from the image forming device. For example, a process cartridge including a developing unit that accommodates the electrostatic charge image developer according to the present exemplary embodiment is preferably used as the process cartridge.

Hereinafter, an example of the image forming device according to the present exemplary embodiment will be described, but the present exemplary embodiment is not limited thereto. Further, main parts shown in the figures will be described, but description of other parts will not be provided.

FIG. 1 is a schematic configuration view showing an image forming device according to the present exemplary embodiment.

The image forming device shown in FIG. 1 includes first to fourth image forming units 10Y, 10M, 10C, and 10K having an electrophotographic system of outputting images of each color of yellow (Y), magenta (M), cyan (C), and black (K) based on color-separated image data. Such image forming units (hereinafter, also simply referred to as "units") 10Y, 10M, 10C, and 10K are arranged in parallel at predetermined intervals in the horizontal direction. The units 10Y, 10M, 10C, and 10K may be process cartridges detachable from the image forming device.

Above the units 10Y, 10M, 10C, and 10K shown in the figure, an intermediate transfer belt 20, extends, as an intermediate transfer member, across each of the units. The intermediate transfer belt 20 is provided by winding around a drive roll 22 and a support roll 24 in contact with the inner surface of the intermediate transfer belt 20, which are disposed to be separated from each other in the lateral direction in the figure, and is designed to travel in a direction from the first unit 10Y to the fourth unit 10K. A force is applied to the support roll 24 in a direction away from the drive roll 22 by a spring or the like (not shown), and a tension is applied to the intermediate transfer belt 20 winding around the support roll 24 and the drive roll 22. Further, an intermediate transfer member cleaning device 30 facing the drive roll 22 is provided on a side surface of the image holding member of the intermediate transfer belt 20.

Each of four colors of yellow toner, magenta toner, cyan toner, and black toner stored in toner cartridges 8Y, 8M, 8C, and 8K is supplied to each of developing devices (an example of developing units) 4Y, 4M, 4C, and 4K of the units 10Y, 10M, 10C, and 10K.

Since the first to fourth units 10Y, 10M, 10C, and 10K have an identical configuration, the first unit 10Y that forms a yellow image disposed on the upstream side in the traveling direction of the intermediate transfer belt will be described as a representative example. Further, the same portions as the first unit 10Y are denoted by the reference numerals with magenta (M), cyan (C), and black (K) in place of yellow (Y), and thus the description of the second to fourth units 10M, 10C, and 10K will not be repeated.

The first unit 10Y includes a photoreceptor 1Y that functions as an image holding member. A charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on a color-separated image signal to form an electrostatic charge image, a developing device (an example of a developing unit) 4Y that supplies the charged toner to the electrostatic charge image to develop the electrostatic charge image, a primary transfer roll 5Y (an example of the primary transfer unit) that transfers the developed toner image onto the intermediate transfer belt 20, and a photoreceptor cleaning device (an example of the cleaning unit) 6Y that removes the toner remaining on the surface of the photoreceptor 1Y after the primary transfer are arranged in this order in the periphery of the photoreceptor 1Y.

The primary transfer roll 5Y is disposed inside the intermediate transfer belt 20 and provided at a position facing the photoreceptor 1Y. Each bias power supply (not shown) that applies a primary transfer bias is connected to each of the primary transfer rolls 5Y, 5M, 5C, and 5K of the units. Each bias power supply changes the value of the transfer bias applied to each primary transfer roll by the control of a control unit (not shown).

Hereinafter, an operation of forming a yellow image in the first unit 10Y will be described.

First, prior to the operation, the surface of the photoreceptor 1Y is charged at a potential of −600 V to −800 V by the charging roll 2Y.

The photoreceptor 1Y is formed by laminating a photosensitive layer on a conductive substrate (for example, a volume resistivity of $1\times10^{-6}$ Ωcm or less at 20° C.). This photosensitive layer usually has a high resistance (the resistance of a typical resin), but has a property that in a case where the photosensitive layer is irradiated with a laser beam 3Y, the specific resistance of the portion irradiated with the laser beam changes. Therefore, the laser beam 3Y is output to the surface of the charged photoreceptor 1Y through the exposure device 3 according to yellow image data sent from the control unit (not shown). The photosensitive layer on the surface of the photoreceptor 1Y is irradiated with laser beam 3Y, and thus an electrostatic charge image with a yellow image pattern is formed on the surface of the photoreceptor 1Y.

The electrostatic charge image is an image formed on the surface of the photoreceptor 1Y by performing charging, which is a so-called negative latent image formed in a case where the specific resistance of the portion in the photosensitive layer irradiated with the laser beam 3Y is decreased by the laser beam 3Y, the charged electric charge on the surface of the photoreceptor 1Y flows, and the electric charge in a portion that has not been irradiated with the laser beam 3Y remains.

The electrostatic charge image formed on the photoreceptor 1Y rotates to a predetermined development position according to the traveling of the photoreceptor 1Y. Further, the electrostatic charge image on the photoreceptor 1Y is visualized (developed) at this development position as a toner image by the developing device 4Y.

For example, an electrostatic charge image developer containing at least a yellow toner and a carrier is accommodated in the developing device 4Y. The yellow toner is stirred to be frictionally charged inside the developing device 4Y, has an electric charge having the same polarity (negative polarity) as the charged electric charge on the photoreceptor 1Y, and is held on a developer roll (an example of the developer holding member). Further, as the surface of the photoreceptor 1Y passes through the developing device 4Y, the yellow toner is electrostatically attached to the electricity-removed latent image portion on the surface of the photoreceptor 1Y, and the latent image is developed by the yellow toner. The photoreceptor 1Y on which the yellow toner image is formed is continuously traveled at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner and is controlled to, for example, $+10^{-}$μA by the control unit (not shown) in the first unit 10Y.

Further, the toner remaining on the photoreceptor 1Y is removed by the photoreceptor cleaning device 6Y and recovered.

The primary transfer bias applied to the primary transfer rolls 5M, 5C, and 5K of the second to fourth units 10M, 10C, and 10K is also controlled according to the first unit.

In this manner, the intermediate transfer belt 20 to which the yellow toner image is transferred by the first unit 10Y is sequentially transported through the second to fourth units 10M, 10C, and 10K, and the toner images of each color are superimposed and multiple-transferred.

The intermediate transfer belt 20, to which the toner images of four colors are multiple-transferred through the first to fourth units, reaches a secondary transfer unit formed of the intermediate transfer belt 20, a support roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is fed to a gap where the secondary transfer roll 26 is in contact with the intermediate transfer belt 20 via a supply mechanism, at a predetermined timing, and a secondary transfer bias is applied to the support roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

Thereafter, the recording paper P is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is preferably used.

The recording paper P in which the fixation of the color images is completed is transported toward a discharge unit, and a series of color image forming operations is completed.

Process Cartridge/Toner Cartridge

The process cartridge according to the present exemplary embodiment will be described.

The process cartridge according to the present exemplary embodiment includes a developing unit which accommodates the electrostatic charge image developer according to the present exemplary embodiment and develops the electrostatic charge image formed on the surface of the image holding member as a toner image using the electrostatic charge image developer, and is detachable from the image forming device.

The configuration of the process cartridge according to the present exemplary embodiment is not limited thereto, and a configuration including a developing device and, as necessary, at least one selected from other units such as an image holding member, a charging unit, an electrostatic charge image forming unit, or a transfer unit may be employed.

Hereinafter, an example of the process cartridge according to the present exemplary embodiment will be described, but the present invention is not limited thereto. Further, main parts shown in the figures will be described, but description of other parts will not be provided.

Figure 2:
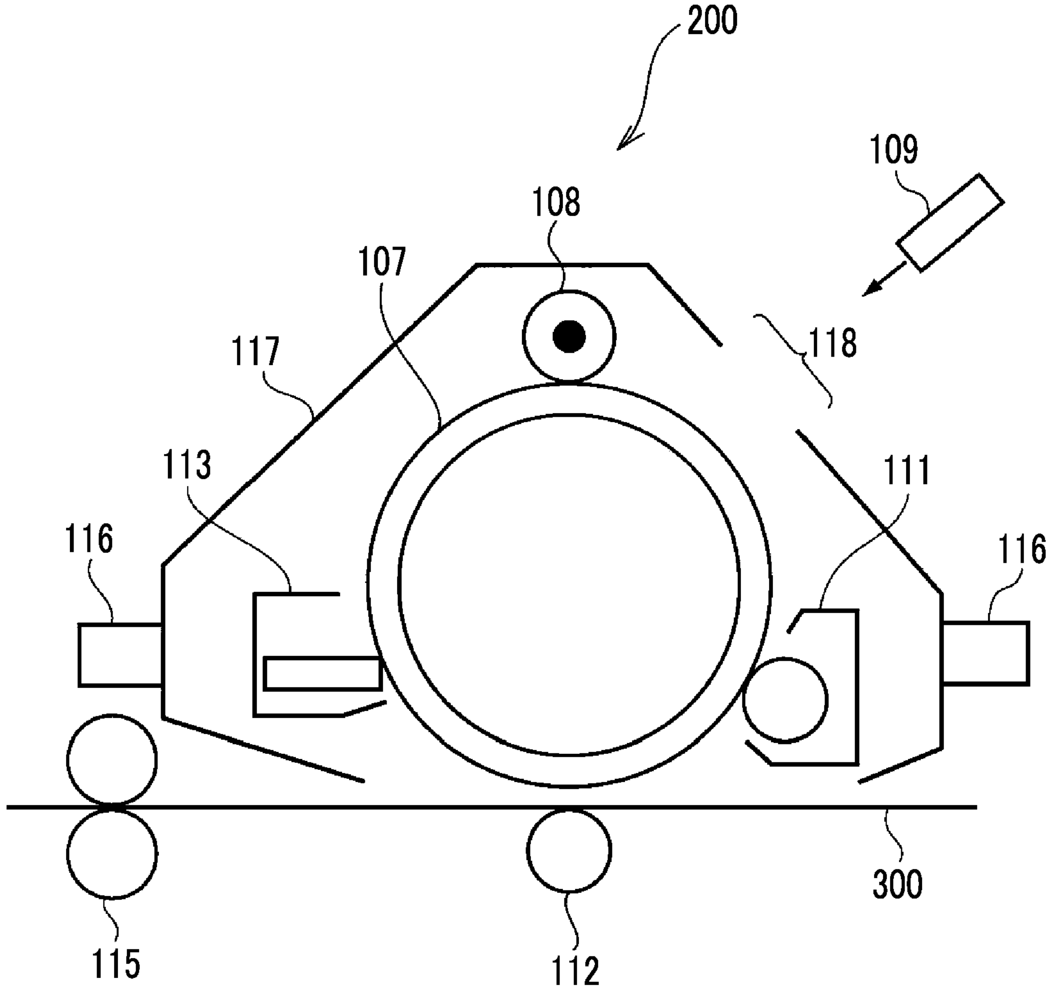
FIG. 2 is a schematic configuration view showing an example of a process cartridge according to the present exemplary embodiment.

FIG. 2 is a schematic configuration view showing the process cartridge according to the present exemplary embodiment.

A process cartridge 200 shown in FIG. 2 is configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

Next, the toner cartridge according to the exemplary embodiment of the present disclosure will be described.

The toner cartridge according to the exemplary embodiment of the present disclosure is a toner cartridge including a container that accommodates the toner according to the exemplary embodiment of the present disclosure and is detachable from the image forming device. The toner cartridge includes a container that accommodates a toner for replenishment which is to be supplied to the developing unit provided in the image forming device.

The image forming device shown in FIG. 1 is an image forming device having a configuration in which the toner cartridges 8Y, 8M, 8C, and 8K are detachable, and the developing devices 4Y, 4M, 4C, and 4K are respectively connected to the toner cartridge corresponding to each developing device (color) through a toner supply tube (not shown). Further, in a case where the amount of toner accommodated in the toner cartridge is decreased, the toner cartridge is replaced.

EXAMPLES

Hereinafter, the present exemplary embodiment will be described in more detail with reference to examples and comparative examples, but the present exemplary embodiment is not limited to such examples. In addition, "part" and showing an amount are on a mass basis unless otherwise specified.

Preparation of Resin Particle Dispersion Liquid

Preparation of Amorphous Polyester Resin Particle Dispersion Liquid (A1)

Preparation of Amorphous Polyester Resin (A)

Terephthalic acid: 70 parts
Fumaric acid: 30 parts
Ethylene glycol: 41 parts
1,5-pentanediol: 48 parts A 5 L flask provided with a stirrer, a nitrogen introduction tube, a temperature sensor, and a rectifying tower is charged with the above-described material and heated to 220° C. for 1 hour under a nitrogen gas stream, and 1 part of titanium tetraethoxy is put into 100 parts of the above-described material. The temperature is increased to 240° C. for 0.5 hours while water to be generated is distilled off, the dehydration condensation reaction is continued at the temperature for 1 hour, and the reaction product is cooled. In this manner, an amorphous polyester resin (A) having a weight-average-molecular weight of 96000 and a glass transition temperature of 61° C. is synthesized.

Preparation of Amorphous Polyester Resin Particle Dispersion Liquid (A1)

40 parts of ethyl acetate and 25 parts of 2-butanol are put into a container provided with a temperature control unit and a nitrogen substitution unit to prepare a mixed solvent, 100 parts of the amorphous polyester resin (A) is gradually added to the solvent to be dissolved therein, and a 10% ammonia aqueous solution (amount equivalent to 3 times the molar ratio with respect to the acid value of the resin) is added thereto, and the solution is stirred for 30 minutes. Next, the inside of the container is substituted with dry nitrogen, the temperature is maintained at 40° C., 400 parts of ion exchange water is added dropwise thereto at a rate of 2 parts/minute while the mixed solution is stirred, and emulsification is performed. After completion of the dropwise addition, the temperature of the emulsified liquid is returned to 25° C., thereby obtaining a resin particle dispersion liquid in which resin particles having a volume average particle diameter of 190 nm are dispersed. The amount of the solid content is adjusted to 20% by adding ion exchange water to the resin particle dispersion liquid, thereby obtaining an amorphous polyester resin particle dispersion liquid (A1).

Preparation of Crystalline Polyester Resin Particle Dispersion Liquid (B1)

Preparation of Crystalline Polyester Resin (B)

1,10-Decanedicarboxylic acid: 265 parts
1,6-Hexanediol: 168 parts
Dibutyl tin oxide (catalyst): 0.3 parts by mass The above-described components are added to a heated and dried three-neck flask, the air in the container is made into an inert atmosphere with nitrogen gas by an operation under reduced pressure, and the mixture is stirred and refluxed at 180° C. for 5 hours by mechanical stirring. Thereafter, the mixture is gradually heated to 230° C. under reduced pressure, stirred for 2 hours, and air-cooled when the mixture enters a viscous state to stop the reaction. In the molecular weight measurement (in terms of polystyrene), the weight-average-molecular weight (Mw) of the obtained "crystalline polyester resin (B)" is 12700, and the melting temperature of the crystalline polyester resin (B) is 73° C.

Preparation of Crystalline Polyester Resin Particle dispersion liquid (B1)

90 parts by mass of the crystalline polyester resin (B), 1.8 parts by mass of an ionic surfactant NEOGEN RK (DKS Co., Ltd.), and 210 parts by mass of ion exchange water are used, the mixture is heated to 120° C., sufficiently dispersed with ULTRA-TURRAX T50 (manufactured by IKA), and subjected to a dispersion treatment using a pressure discharge type Gaulin homogenizer for 1 hour, thereby obtaining a crystalline polyester resin particle dispersion liquid (B1) having a volume average particle diameter of 190 nm and a solid content of 20% by mass.

Preparation of Styrene Acrylic Resin Particle Dispersion Liquid (S1)

Styrene: 3,750 parts
n-Butyl acrylate: 250 parts
Acrylic acid: 20 parts
Dodecanethiol: 240 parts
Carbon tetrabromide: 40 parts The mixture obtained by mixing and dissolving the above-described materials is dispersed and emulsified in a surfactant solution obtained by dissolving 60 parts of a nonionic surfactant (NONIPOL 400, manufactured by Sanyo Chemical Industries, Ltd.) and 100 parts of an anionic surfactant (TaycaPower, manufactured by Tayca Corporation) in 5,500 parts of ion exchange water, in a reaction vessel. Next, an aqueous solution obtained by dissolving 40 parts of ammonium persulfate in 500 parts of ion exchange water is added to the solution for 20 minutes while the solution inside the reaction vessel is stirred. Next, after nitrogen substitution, the content is heated to 70° C. while the solution inside the reaction vessel is stirred, and the temperature is maintained at 70° C. for 5 hours to continue emulsion polymerization. In this manner, a resin particle dispersion liquid in which resin particles having a volume average particle diameter of 160 nm are dispersed is obtained. The amount of the solid content is adjusted to 20% by adding ion exchange water to the resin particle dispersion liquid, thereby obtaining a styrene acrylic resin particle dispersion liquid (S1).

Preparation of Styrene Acrylic-Modified Polyester Resin Particle Dispersion Liquid (S2)

The inside of a four-neck flask provided with a nitrogen introduction tube, a dehydration tube, a stirrer, and a thermocouple is substituted with nitrogen, 5,670 parts of polyoxypropylene (2.2)-2,2-bis(4-hydroxyphenyl)propane, 585 parts of polyoxyethylene (2.0)-2,2-bis(4-hydroxyphenyl) propane, 2,450 parts of terephthalic acid, and 44 parts of tin (II) di(2-ethylhexanoate) are added to the flask, the mixture is stirred in a nitrogen atmosphere, heated to 235° C., and maintained at the same temperature for 5 hours, and the pressure inside the flask is further reduced and maintained at 8.0 kPa for 1 hour. After the pressure is returned to the atmospheric pressure, the mixture is cooled to 190° C., 42 parts of fumaric acid and 207 parts of trimellitic acid are added thereto, and the mixture is maintained at a temperature of 190° C. for 2 hours and heated to 210° C. for 2 hours. Further, the pressure in the flask is reduced and maintained at 8.0 kPa for 4 hours, thereby obtaining an amorphous polyester resin A (polyester segment).

Next, 800 parts of the amorphous polyester resin A is added to a four-neck flask provided with a cooling tube, a stirrer, and a thermocouple, and the mixture is stirred at a stirring rate of 200 rpm in a nitrogen atmosphere. Thereafter, 100 parts of styrene, 82 parts of butyl acrylate, 16 parts of acrylic acid, 2 parts of 1,10-decanediol diacrylate, and 1,000 parts of toluene are added thereto as addition-polymerizable monomers, and the mixture is further mixed for 30 minutes.

Further, 6 parts of polyoxyethylene alkyl ether (nonionic surfactant, trade name: EMULGEN 430, manufactured by Kao Corporation), 40 parts of a 15% sodium dodecylbenzenesulfonate aqueous solution (anionic surfactant, trade name: NEOPELEX G-15, manufactured by Kao Corporation), and 233 parts of 5% potassium hydroxide are added thereto, and the mixture is heated to 95° C. so as to be melted while being stirred and mixed at 95° C. for 2 hours, thereby obtaining a resin mixture solution.

Next, 1,145 parts of ion exchange water is added dropwise to the resin mixture solution at a rate of 6 parts/min while the resin mixture solution is stirred, thereby obtaining an emulsion. Next, the obtained emulsion is cooled to 25° C. and passed through a 200-mesh wire net, and ion exchange water is added thereto to adjust the solid content to 20% by mass, thereby obtaining a styrene acrylic-modified polyester resin particle dispersion liquid (S2).

Further, the "mass ratio of the styrene acrylic copolymer segment to the polyester resin segment (styrene acrylic copolymer segment/polyester resin segment)" of the synthesized styrene-acrylic-modified polyester resin is 10/90.

Preparation of Release Agent Particle Dispersion Liquid

Preparation of Release Agent Particle Dispersion Liquid (W1)

70 parts by mass of an ester-based wax (WEP-5, manufactured by NOF Corporation, melting temperature of 85° C.), 1 part by mass of an anionic surfactant (NEOGEN RK, manufactured by DKS Co., Ltd.), and 200 parts by mass of ion exchange water are mixed and dispersed for 10 minutes using a homogenizer (ULTRA-TURRAX T50, manufactured by IKA). Ion exchange water is added thereto so that the solid content in the dispersion liquid reaches 20% by mass, thereby obtaining a colorant particle dispersion liquid (W1). The volume average particle diameter of the colorant particles in the colorant particle dispersion liquid is 240 nm.

Preparation of Release Agent Particle Dispersion Liquid (W2)

A release agent particle dispersion liquid (W2) is prepared in the same manner as that for the preparation of the release agent particle dispersion liquid (W1) except that the ester-based wax (WEP-5, manufactured by NOF Corporation, melting temperature of 85° C.) is changed to an ester-based wax (WEP-9, manufactured by NOF Corporation, melting temperature of 67° C.)

Preparation of Release Agent Particle Dispersion Liquid (W3)

A release agent particle dispersion liquid (W3) is prepared in the same manner as that for the preparation of the release agent particle dispersion liquid (W1) except that the ester-based wax (WEP-5, manufactured by NOF Corporation, melting temperature of 85° C.) is changed to an ester-based wax (WEP-2, manufactured by NOF Corporation, melting temperature of 60° C.)

Preparation of Release Agent Particle Dispersion Liquid (W4)

A release agent particle dispersion liquid (W4) is prepared in the same manner as that for the preparation of the release agent particle dispersion liquid (W1) except that the ester-based wax (WEP-5, manufactured by NOF Corporation, melting temperature of 85° C.) is changed to a paraffin wax (HNP-11, manufactured by Nippon Seiro Co., Ltd., melting temperature of 68° C.)

Preparation of Release Agent Particle Dispersion Liquid (W5)

A release agent particle dispersion liquid (W5) is prepared in the same manner as that for the preparation of the release agent particle dispersion liquid (W1) except that the ester-based wax (WEP-5, manufactured by NOF Corporation, melting temperature of 85° C.) is changed to a paraffin-based wax (HNP-0190, manufactured by Nippon Seiro Co., Ltd., melting temperature of 89° C.).

Preparation of Colorant Particle Dispersion Liquid

Preparation of Colorant Particle Dispersion Liquid (Y1)

70 parts by mass of Pigment Yellow 74 (manufactured by Clariant, Hansa Yellow 5GX01) as a yellow pigment, 1 part by mass of an anionic surfactant (NEOGEN RK, manufactured by DKS Co., Ltd.), and 200 parts by mass of ion exchange water are mixed and dispersed for 10 minutes using a homogenizer (ULTRA-TURRAX T50, manufactured by IKA). Ion exchange water is added thereto so that the solid content in the dispersion liquid reaches 20% by mass, thereby obtaining a colorant particle dispersion liquid (Y1). The volume average particle diameter of the colorant particles in the colorant particle dispersion liquid is 190 nm.

Preparation of Colorant Particle Dispersion Liquid (C1)

A colorant particle dispersion liquid (C1) is prepared in the same manner as the preparation for the colorant particle dispersion liquid (C1) except that the yellow pigment is changed to a cyan pigment Pigment Blue 15:3 (ECB-301, manufactured by Nippon Seiro Co., Ltd.).

Example 1

Preparation of Toner Particles

First Aggregated Particle Formation Step

- Styrene acrylic resin particle dispersion liquid (S1): 115 parts
- Amorphous polyester resin particle dispersion liquid (A1): 110 parts
- Crystalline polyester resin particle dispersion liquid (B1): 50 parts
- Colorant particle dispersion liquid (Y1): 25 parts
- Release agent particle dispersion liquid (W1): 50 parts
- Anionic surfactant (NEOGEN RK, manufactured by DKS Co., Ltd., 20%): 10 parts
- Ion exchange water: 215 parts The above-described components are added to a 3 L reaction container provided with a thermometer, a pH meter, and a stirrer, and the mixture is maintained at a temperature of 30° C. and a stirring rotation speed of 150 rpm for 30 minutes while the temperature controlled with a mantle heater from the outside. Thereafter, a 0.3N nitric acid aqueous solution is added to the mixture to adjust the pH in the aggregation step to 3.0.

An aqueous solution obtained by dissolving 5 parts of magnesium chloride-hexahydrate in 20 parts of ion exchange water is added to the solution for 10 minutes while being dispersed with a homogenizer (ULTRA-TURRAX T50, manufactured by IKA). Thereafter, the solution is heated to 50° C. while being stirred, the particle diameter is measured with Coulter Multisizer II (aperture diameter: 50 μm, manufactured by Beckman Coulter Inc.), and the volume average particle diameter of the first aggregated particles is set to 4.7 μm.

Second Aggregated Particle Formation Step and Third Aggregated Particle Formation Step Next, a mixed solution of 30 parts of the styrene acrylic resin particle dispersion liquid (S1) adjusted to have a pH of 4.0 and 40 parts of the release agent particle dispersion liquid (W1) is additionally added to the solution and held for 30 minutes. Thereafter, a PAC aqueous solution obtained by dissolving 1.0 parts of polyaluminum chloride (PAC, manufactured by Oji Paper Co., Ltd., 30% powder product) in 20 parts of ion exchange water is added thereto. Further, 75 parts of the styrene acrylic resin particle dispersion liquid (S1) adjusted to have a pH of 4.0 is additionally added thereto, and a PAC aqueous solution obtained by dissolving 1.0 parts of PAC (manufactured by Oji Paper Co., Ltd., 30% powder product) in 20 parts of ion exchange water is further added thereto to adjust the volume average particle diameter of the third aggregated particles to 5.5 μm.

Fusion and Coalescence Step

Subsequently, 20 parts of a 10% NTA (nitrilotriacetic acid) metal salt aqueous solution (CHELEST 70: manufactured by Chelest Corporation) is added thereto, and the pH of the resulting solution is adjusted to 9.0 using a 1N sodium hydroxide aqueous solution. Thereafter, the temperature during coalescence is increased to 80° C., maintained for 60 minutes, and lowered to 30° C., and the solution is filtered to obtain coarse toner particles.

The operation of redispersing the particles in ion exchange water and filtering the solution is repeatedly performed, the particles are washed until the electrical conductivity of the filtrate reaches 20 μS/cm or less and vacuum-dried in an oven at 40° C. for 5 hours, thereby obtaining yellow toner particles.

Next, cyan toner particles are obtained by performing the same operation as described above except that the colorant particle dispersion liquid (C1) is changed to a colorant particle dispersion liquid (C2).

Preparation of Toner 1.5 parts of hydrophobic silica (RY50, manufactured by Nippon Aerosil Co., Ltd.) and 1.0 parts of hydrophobic titanium oxide (T805, manufactured by Nippon Aerosil Co., Ltd.) with respect to 100 parts of the obtained yellow toner particles are mixed at 10,000 rpm (revolutions per minute) for 30 seconds using a sample mill. Thereafter, the mixture is sieved with a vibrating sieve having a mesh opening of 45 μm to prepare a yellow toner having a volume average particle diameter of 5.5 μm.

Similarly, a cyan toner is prepared by performing the same operation as described above except that the yellow toner particles are changed to cyan toner particles.

The combination of the obtained yellow toner and the cyan toner is used in Example 1, and the following evaluation is performed.

Examples 2 to 29 and Comparative Examples 1 to 3

In Examples 2 to 29 and Comparative Examples 1 to 3, yellow toner particles and cyan toner particles are obtained in the same manner as in Example 1 except that the conditions of each step are appropriately changed as listed in Tables 1 to 5 shown below.

Further, yellow toners and cyan toners are obtained using the obtained toner particles in the same manner as in Example 1.

The aggregating agents used in each example are as follows.

Magnesium chloride-hexahydrate (denoted as $MgCl_2.6H_2O$ in tables)
Polyaluminum chloride (denoted as PAC in tables)
Calcium chloride-dihydrate (denoted as $CaCl_2.2H_2O$ in tables) Ferric chloride-hexahydrate (indicated as $FeCl_3.6H_2O$ in tables)

TABLE 1

| | | First aggregated particle formation step | | | | | | | | | | |
|---|---|---|---|---|---|---|---|---|---|---|---|---|
| | | Amount of binder resin particle dispersion liquid [part] | | | | Colorant particle dispersion liquid | | Release agent particle dispersion liquid | | First aggregating agent | | Volume average particle diameter of aggregated particles |
| | Type of toner | Dispersion liquid S1 | Dispersion liquid S2 | Dispersion liquid A1 | Dispersion liquid B1 | Type | Part | Type | Part | Type | Part | [μm] |
| Example1 | Yellow toner | 115 | — | 110 | 50 | Y1 | 25 | W1 | 50 | $MgCl_2•6H_2O$ | 20 | 4.7 |
| | Cyan toner | 115 | — | 110 | 50 | C1 | 25 | W1 | 50 | $MgCl_2•6H_2O$ | 20 | 4.7 |
| Example2 | Yellow toner | 115 | — | 110 | 50 | Y1 | 25 | W1 | 50 | $MgCl_2•6H_2O$ | 20 | 4.7 |
| | Cyan toner | 115 | — | 110 | 50 | C1 | 25 | W1 | 50 | $MgCl_2•6H_2O$ | 20 | 4.7 |
| Example3 | Yellow toner | 115 | — | 110 | 50 | Y1 | 25 | W1 | 50 | $MgCl_2•6H_2O$ | 20 | 4.7 |
| | Cyan toner | 115 | — | 110 | 50 | C1 | 25 | W1 | 50 | $MgCl_2•6H_2O$ | 20 | 4.7 |
| Example4 | Yellow toner | 115 | — | 110 | 50 | Y1 | 25 | W1 | 50 | $MgCl_2•6H_2O$ | 20 | 5.7 |
| | Cyan toner | 115 | — | 110 | 50 | C1 | 25 | W1 | 50 | $MgCl_2•6H_2O$ | 20 | 5.7 |
| Example5 | Yellow toner | 115 | — | 110 | 50 | Y1 | 25 | W1 | 50 | $MgCl_2•6H_2O$ | 20 | 3.0 |
| | Cyan toner | 115 | — | 110 | 50 | C1 | 25 | W1 | 50 | $MgCl_2•6H_2O$ | 20 | 3.0 |
| Example6 | Yellow toner | 115 | — | 110 | 50 | Y1 | 25 | W1 | 50 | $MgCl_2•6H_2O$ | 20 | 3.0 |
| | Cyan toner | 115 | — | 110 | 50 | C1 | 25 | W1 | 50 | $MgCl_2•6H_2O$ | 20 | 3.0 |
| Example7 | Yellow toner | 115 | — | 110 | 50 | Y1 | 25 | W1 | 50 | $MgCl_2•6H_2O$ | 7 | 4.7 |
| | Cyan toner | 115 | — | 110 | 50 | C1 | 25 | W1 | 50 | $MgCl_2•6H_2O$ | 7 | 4.7 |

| | | Second aggregated particle formation step | | | Third aggregated particle formation step | | | Fusion and coalescence step and the like | | Volume average particle diameter of toner particles |
|---|---|---|---|---|---|---|---|---|---|---|
| | | Amount of dispersion liquid S1 | Second aggregating agent | | Amount of dispersion liquid S1 | Third aggregating agent | | Amount of 10% NTA metal salt aqueous solution | Coalescence temperature | |
| | Type of toner | [part] | Type | Part | [part] | Type | Part | [part] | [° C.] | [μm] |
| Example1 | Yellow toner | 75 | PAC | 1.0 | 75 | PAC | 1.0 | 20 | 80 | 5.5 |
| | Cyan toner | 75 | PAC | 1.0 | 75 | PAC | 1.0 | 20 | 80 | 5.5 |
| Example2 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 20 | 87 | 5.5 |
| Example3 | Yellow toner | 75 | PAC | 1.0 | 75 | PAC | 1.0 | 20 | 94 | 5.5 |
| | Cyan toner | 75 | PAC | 1.0 | 75 | PAC | 1.0 | 20 | 94 | 5.5 |
| Example4 | Yellow toner | 75 | PAC | 1.0 | 75 | PAC | 1.0 | 20 | 96 | 6.5 |
| | Cyan toner | 75 | PAC | 1.0 | 75 | PAC | 1.0 | 20 | 96 | 6.5 |
| Example5 | Yellow toner | 75 | PAC | 1.0 | 75 | PAC | 1.0 | 20 | 78 | 3.8 |
| | Cyan toner | 75 | PAC | 1.0 | 75 | PAC | 1.0 | 20 | 78 | 3.9 |

TABLE 1-continued

| | | | | | | | | | | |
|---|---|---|---|---|---|---|---|---|---|---|
| Example6 | Yellow toner | 75 | PAC | 1.0 | 75 | PAC | 1.0 | 20 | 94 | 3.8 |
| | Cyan toner | 75 | PAC | 1.0 | 75 | PAC | 1.0 | 20 | 94 | 3.8 |
| Example7 | Yellow toner | 75 | PAC | 1.0 | 75 | PAC | 1.0 | 100 | 87 | 5.5 |
| | Cyan toner | 75 | PAC | 1.0 | 75 | PAC | 1.0 | 100 | 87 | 5.5 |

TABLE 2

| | | First aggregated particle formation step | | | | | | | | | | |
|---|---|---|---|---|---|---|---|---|---|---|---|---|
| | | Amount of binder resin particle dispersion liquid [part] | | | | Colorant particle dispersion liquid | | Release agent particle dispersion liquid | | First aggregating agent | | Volume average particle diameter of aggregated particles |
| | Type of toner | Dispersion liquid S1 | Dispersion liquid S2 | Dispersion liquid A1 | Dispersion liquid B1 | Type | Part | Type | Part | Type | Part | [μm] |
| Example8 | Yellow toner | 115 | — | 110 | 50 | Y1 | 25 | W1 | 50 | $MgCl_2•6H_2O$ | 7 | 4.7 |
| | Cyan toner | 115 | — | 110 | 50 | C1 | 25 | W1 | 50 | $MgCl_2•6H_2O$ | 7 | 4.7 |
| Example9 | Yellow toner | 115 | — | 110 | 50 | Y1 | 25 | W1 | 50 | $MgCl_2•6H_2O$ | 20 | 4.7 |
| | Cyan toner | 115 | — | 110 | 50 | C1 | 25 | W1 | 50 | $MgCl_2•6H_2O$ | 20 | 4.7 |
| Example10 | Yellow toner | 115 | — | 110 | 50 | Y1 | 25 | W1 | 50 | $MgCl_2•6H_2O$ | 25 | 4.7 |
| | Cyan toner | 115 | — | 110 | 50 | C1 | 25 | W1 | 50 | $MgCl_2•6H_2O$ | 25 | 4.7 |
| Example11 | Yellow toner | 115 | — | 110 | 50 | Y1 | 25 | W1 | 50 | $MgCl_2•6H_2O$ | 25 | 4.7 |
| | Cyan toner | 115 | — | 110 | 50 | C1 | 25 | W1 | 50 | $MgCl_2•6H_2O$ | 25 | 4.7 |
| Example12 | Yellow toner | 115 | — | 110 | 50 | Y1 | 25 | W1 | 50 | $MgCl_2•6H_2O$ | 25 | 4.7 |
| | Cyan toner | 115 | — | 110 | 50 | C1 | 25 | W1 | 50 | $MgCl_2•6H_2O$ | 25 | 4.7 |
| Example13 | Yellow toner | 115 | — | 110 | 50 | Y1 | 25 | W1 | 50 | $MgCl_2•6H_2O$ | 7 | 4.7 |
| | Cyan toner | 115 | — | 110 | 50 | C1 | 25 | W1 | 50 | $MgCl_2•6H_2O$ | 7 | 4.7 |
| Example14 | Yellow toner | 115 | — | 110 | 50 | Y1 | 25 | W1 | 50 | $MgCl_2•6H_2O$ | 7 | 4.7 |
| | Cyan toner | 115 | — | 110 | 50 | C1 | 25 | W1 | 50 | $MgCl_2•6H_2O$ | 7 | 4.7 |

| | | Second aggregated particle formation step | | | Third aggregated particle formation step | | | Fusion and coalescence step and the like | | Volume average particle diameter of toner particles |
|---|---|---|---|---|---|---|---|---|---|---|
| | | Amount of dispersion liquid S1 | Second aggregating agent | | Amount of dispersion liquid S1 | Third aggregating agent | | Amount of 10% NTA metal salt aqueous solution | Coalescence temperature | |
| | Type of toner | [part] | Type | Part | [part] | Type | Part | [part] | [° C.] | [μm] |
| Example8 | Yellow toner | 75 | PAC | 1.0 | 75 | PAC | 1.0 | 80 | 87 | 5.5 |
| | Cyan toner | 75 | PAC | 1.0 | 75 | PAC | 1.0 | 80 | 87 | 5.5 |
| Example9 | Yellow toner | 75 | PAC | 2.0 | 75 | PAC | 2.0 | 10 | 87 | 5.6 |
| | Cyan toner | 75 | PAC | 2.0 | 75 | PAC | 2.0 | 10 | 87 | 5.7 |
| Example10 | Yellow toner | 75 | PAC | 3.0 | 75 | PAC | 3.0 | 10 | 87 | 5.8 |
| | Cyan toner | 75 | PAC | 3.0 | 75 | PAC | 3.0 | 10 | 87 | 5.7 |

TABLE 2-continued

| | | | | | | | | | | |
|---|---|---|---|---|---|---|---|---|---|---|
| Example11 | Yellow toner | 75 | PAC | 0.5 | 75 | PAC | 0.5 | 20 | 87 | 5.5 |
| | Cyan toner | 75 | PAC | 0.5 | 75 | PAC | 0.5 | 20 | 87 | 5.5 |
| Example12 | Yellow toner | 75 | PAC | 0.7 | 75 | PAC | 0.7 | 20 | 87 | 5.5 |
| | Cyan toner | 75 | PAC | 0.7 | 75 | PAC | 0.7 | 20 | 87 | 5.5 |
| Example13 | Yellow toner | 75 | PAC | 2.5 | 75 | PAC | 2.5 | 10 | 87 | 5.5 |
| | Cyan toner | 75 | PAC | 2.5 | 75 | PAC | 2.5 | 10 | 87 | 5.5 |
| Example14 | Yellow toner | 75 | PAC | 2.0 | 75 | PAC | 2.0 | 10 | 87 | 5.5 |
| | Cyan toner | 75 | PAC | 2.0 | 75 | PAC | 2.0 | 10 | 87 | 5.5 |

TABLE 3

| | | First aggregated particle formation step | | | | | | | | | | |
|---|---|---|---|---|---|---|---|---|---|---|---|---|
| | | Amount of binder resin particle dispersion liquid [part] | | | | Colorant particle dispersion liquid | | Release agent particle dispersion liquid | | First aggregating agent | | Volume average particle diameter of aggregated particles |
| | Type of toner | Dispersion liquid S1 | Dispersion liquid S2 | Dispersion liquid A1 | Dispersion liquid B1 | Type | Part | Type | Part | Type | Part | [μm] |
| Example15 | Yellow toner | 115 | — | 110 | 50 | Y1 | 25 | W1 | 50 | $MgCl_2$•$6H_2O$<br>PAC | 20<br>1 | 4.7 |
| | Yellow toner | 115 | — | 110 | 50 | C1 | 25 | W1 | 50 | $MgCl_2$•$6H_2O$<br>PAC | 20<br>1 | 4.7 |
| Example16 | Yellow toner | 115 | — | 110 | 50 | Y1 | 25 | W1 | 50 | $MgCl_2$•$6H_2O$ | 15 | 4.7 |
| | Yellow toner | 115 | — | 110 | 50 | C1 | 25 | W1 | 50 | $MgCl_2$•$6H_2O$ | 15 | 4.7 |
| Example17 | Yellow toner | 115 | — | 110 | 50 | Y1 | 25 | W1 | 50 | $CaCl_2$•$2H_20$ | 5 | 4.7 |
| | Cyan toner | 115 | — | 110 | 50 | C1 | 25 | W1 | 50 | $CaCl_2$•$2H_20$ | 5 | 4.7 |
| Example18 | Yellow toner | 115 | — | 110 | 50 | Y1 | 25 | W1 | 50 | $CaCl_2$•$2H_20$ | 15 | 4.7 |
| | Cyan toner | 115 | — | 110 | 50 | C1 | 25 | W1 | 50 | $CaCl_2$•$2H_20$ | 15 | 4.7 |
| Example19 | Yellow toner | 115 | — | 110 | 50 | Y1 | 25 | W1 | 50 | $MgCl_2$•$6H_2O$ | 7 | 4.7 |
| | Cyan toner | 115 | — | 110 | 50 | C1 | 25 | W1 | 50 | $MgCl_2$•$6H_2O$ | 7 | 4.7 |
| Example20 | Yellow toner | 115 | — | 110 | 50 | Y1 | 25 | W1 | 50 | $MgCl_2$•$6H_2O$ | 20 | 4.7 |
| | Cyan toner | 115 | — | 110 | 50 | Cl | 25 | W1 | 50 | $MgCl_2$•$6H_2O$ | 20 | 4.7 |
| Example21 | Yellow toner | 115 | — | 110 | 50 | Y1 | 25 | W3 | 50 | $MgCl_2$•$6H_2O$ | 20 | 4.7 |
| | Cyan toner | 115 | — | 110 | 50 | C1 | 25 | W3 | 50 | $MgCl_2$•$6H_2O$ | 20 | 4.7 |

| | | Second aggregated particle formation step | | | Third aggregated particle formation step | | | Fusion and coalescence step and the like | | Volume average particle diameter of toner particle |
|---|---|---|---|---|---|---|---|---|---|---|
| | | Amount of dispersion liquid S1 | Second aggregating agent | | Amount of dispersion liquid S1 | Third aggregating agent | | Amount of 10% NTA metal salt aqueous solution | Coalescence temperature | |
| | Type of toner | [part] | Type | Part | [part] | Type | Part | [part] | [° C.] | [μm] |
| Example15 | Yellow toner | 75 | PAC | 0.5 | 75 | PAC | 0.5 | 20 | 87 | 5.5 |
| | Yellow toner | 75 | PAC | 0.5 | 75 | PAC | 0.5 | 20 | 87 | 5.5 |

TABLE 3-continued

| | | | | | | | | | | |
|---|---|---|---|---|---|---|---|---|---|---|
| Example16 | Yellow toner | 75 | PAC<br>$MgCl_2$•$6H_2O$ | 2.0<br>2.5 | 75 | PAC<br>$MgCl_2$•$6H_2O$ | 2.0<br>2.5 | 20 | 87 | 5.5 |
| | Yellow toner | 75 | PAC<br>$MgCl_2$•$6H_2O$ | 2.0<br>2.5 | 75 | PAC<br>$MgCl_2$•$6H_2O$ | 2.0<br>2.5 | 20 | 87 | 5.5 |
| Example17 | Yellow toner | 75 | PAC | 1.0 | 75 | PAC | 1.0 | 80 | 87 | 5.5 |
| | Cyan toner | 75 | PAC | 1.0 | 75 | PAC | 1.0 | 80 | 87 | 5.5 |
| Example18 | Yellow toner | 75 | PAC | 2.0 | 75 | PAC | 2.0 | 10 | 87 | 5.7 |
| | Cyan toner | 75 | PAC | 2.0 | 75 | PAC | 2.0 | 10 | 87 | 5.8 |
| Example19 | Yellow toner | 75 | $FeCl_3$•$6H_2O$ | 10.0 | 75 | $FeCl_3$•$6H_2O$ | 10.0 | 80 | 87 | 5.5 |
| | Cyan toner | 75 | $FeCl_3$•$6H_2O$ | 10.0 | 75 | $FeCl_3$•$6H_2O$ | 10.0 | 80 | 87 | 5.5 |
| Example20 | Yellow toner | 75 | $FeCl_3$•$6H_2O$ | 15 | 75 | $FeCl_3$•$6H_2O$ | 15 | 80 | 87 | 5.8 |
| | Cyan toner | 75 | $FeCl_3$•$6H_2O$ | 15 | 75 | $FeCl_3$•$6H_2O$ | 15 | 80 | 87 | 5.6 |
| Example21 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 20 | 87 | 5.5 |

TABLE 4

| | | First aggregated particle formation step | | | | | | | | | | |
|---|---|---|---|---|---|---|---|---|---|---|---|---|
| | | Amount of binder resin particle dispersion liquid [part] | | | | Colorant particle dispersion liquid | | Release agent particle dispersion liquid | | First aggregating agent | | Volume average particle diameter of aggregated particles |
| | Type of toner | Dispersion liquid S1 | Dispersion liquid S2 | Dispersion liquid A1 | Dispersion liquid B1 | Type | Part | Type | Part | Type | Part | [μm] |
| Example22 | Yellow toner | 115 | — | 110 | 50 | Y1 | 25 | W2 | 50 | $MgCl_2$•$6H_2O$ | 20 | 4.7 |
| | Cyan toner | 115 | — | 110 | 50 | C1 | 25 | W2 | 50 | $MgCl_2$•$6H_2O$ | 20 | 4.7 |
| Example23 | Yellow toner | 115 | — | 110 | 50 | Y1 | 25 | W4 | 50 | $MgCl_2$•$6H_2O$ | 20 | 4.7 |
| | Cyan toner | 115 | — | 110 | 50 | C1 | 25 | W4 | 50 | $MgCl_2$•$6H_2O$ | 20 | 4.7 |
| Example24 | Yellow toner | 115 | — | 110 | 50 | Y1 | 25 | W5 | 50 | $MgCl_2$•$6H_2O$ | 20 | 4.7 |
| | Cyan toner | 115 | — | 110 | 50 | C1 | 25 | W5 | 50 | $MgCl_2$•$6H_2O$ | 20 | 4.7 |
| Example25 | Yellow toner | 115 | — | 110 | 50 | Y1 | 25 | W1 | 50 | $MgCl_2$•$6H_2O$ | 20 | 4.7 |
| | Cyan toner | 115 | — | 110 | 50 | C1 | 25 | W1 | 50 | $MgCl_2$•$6H_2O$ | 20 | 4.7 |
| Example26 | Yellow toner | 115 | — | 110 | 50 | Y1 | 25 | W1 | 50 | $MgCl_2$•$6H_2O$ | 20 | 4.7 |
| | Cyan toner | 115 | — | 110 | 50 | C1 | 25 | W1 | 50 | $MgCl_2$•$6H_2O$ | 20 | 4.7 |
| Example27 | Yellow toner | — | 115 | 110 | 50 | Y1 | 25 | W1 | 50 | $MgCl_2$•$6H_2O$ | 20 | 4.7 |
| | Cyan toner | — | 115 | 110 | 50 | C1 | 25 | W1 | 50 | $MgCl_2$•$6H_2O$ | 20 | 4.7 |
| Example28 | Yellow toner | — | 115 | 110 | 50 | Y1 | 25 | W1 | 50 | $MgCl_2$•$6H_2O$ | 20 | 4.7 |
| | Cyan toner | — | 115 | 110 | 50 | C1 | 25 | W1 | 50 | $MgCl_2$•$6H_2O$ | 20 | 4.7 |
| Example29 | Yellow toner | — | 115 | 110 | 50 | Y1 | 25 | W1 | 50 | $MgCl_2$•$6H_2O$ | 20 | 4.7 |
| | Cyan toner | — | 115 | 110 | 50 | C1 | 25 | W1 | 50 | $MgCl_2$•$6H_2O$ | 20 | 4.7 |

TABLE 4-continued

| | Type of toner | Second aggregated particle formation step: Amount of dispersion liquid S1 [part] | Second aggregating agent: Type | Second aggregating agent: Part | Third aggregated particle formation step: Amount of dispersion liquid S1 [part] | Third aggregating agent: Type | Third aggregating agent: Part | Fusion and coalescence step and the like: Amount of 10% NTA metal salt aqueous solution [part] | Coalescence temperature [° C.] | Volume average particle diameter of toner particles [μm] |
|---|---|---|---|---|---|---|---|---|---|---|
| Example22 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 20 | 87 | 5.5 |
| Example23 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 20 | 87 | 5.5 |
| Example24 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 20 | 87 | 5.5 |
| Example25 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 17 | 87 | 5.5 |
| Example26 | Yellow toner | 75 | PAC | 1.0 | 75 | PAC | 1.0 | 20 | 80 | 5.5 |
| | Cyan toner | 75 | PAC | 1.0 | 75 | PAC | 1.0 | 20 | 94 | 5.5 |
| Example27 | Yellow toner | 75 | PAC | 1.0 | 75 | PAC | 1.0 | 20 | 80 | 5.5 |
| | Cyan toner | 75 | PAC | 1.0 | 75 | PAC | 1.0 | 20 | 80 | 5.5 |
| Example28 | Yellow toner | 75 | PAC | 1.0 | 75 | PAC | 1.0 | 20 | 87 | 5.5 |
| | Cyan toner | 75 | PAC | 1.0 | 75 | PAC | 1.0 | 20 | 87 | 5.5 |
| Example29 | Yellow toner | 75 | PAC | 1.0 | 75 | PAC | 1.0 | 20 | 94 | 5.5 |
| | Cyan toner | 75 | PAC | 1.0 | 75 | PAC | 1.0 | 20 | 94 | 5.5 |

TABLE 5

| | Type of toner | First aggregated particle formation step: Amount of binder resin particle dispersion liquid [part]: Dispersion liquid S1 | Dispersion liquid S2 | Dispersion liquid A1 | Dispersion liquid B1 | Colorant particle dispersion liquid: Type | Part | Release agent particle dispersion liquid: Type | Part | First aggregating agent: Type | Part | Volume average particle diameter of aggregated particles [μm] |
|---|---|---|---|---|---|---|---|---|---|---|---|---|
| Comparative example1 | Yellow toner | 115 | — | 110 | 50 | Y1 | 25 | W1 | 50 | $MgCl_2 \cdot 6H_2O$ | 20 | 3.4 |
| | Cyan toner | 115 | — | 110 | 50 | C1 | 25 | W1 | 50 | $MgCl_2 \cdot 6H_2O$ | 20 | 3.4 |
| Comparative example2 | Yellow toner | 115 | — | 110 | 50 | Y1 | 25 | W1 | 50 | $MgCl_2 \cdot 6H_2O$ | 20 | 4.7 |
| | Cyan toner | 115 | — | 110 | 50 | C1 | 25 | W1 | 50 | $MgCl_2 \cdot 6H_2O$ | 20 | 4.7 |

TABLE 5-continued

| | | | | | | | | | | | | |
|---|---|---|---|---|---|---|---|---|---|---|---|---|
| Comparative example3 | Yellow toner | 115 | — | 110 | 50 | Y1 | 25 | W1 | 50 | $MgCl_2$•$6H_2O$ | 20 | 4.7 |
| | Cyan toner | 115 | — | 110 | 50 | C1 | 25 | W1 | 50 | $MgCl_2$•$6H_2O$ | 20 | 4.7 |

| | | Second aggregated particle formation step | | | Third aggregated particle formation step | | | Fusion and coalescence step and the like | | Volume average particle diameter of toner particle |
|---|---|---|---|---|---|---|---|---|---|---|
| | Type of toner | Amount of dispersion liquid S1 [part] | Second aggregating agent Type | Part | Amount of dispersion liquid S1 [part] | Third aggregating agent Type | Part | Amount of 10% NTA metal salt aqueous solution [part] | Coalescence temperature [° C.] | [μm] |
| Comparative example1 | Yellow toner | 75 | PAC | 1.0 | 75 | PAC | 1.0 | 20 | 78 | 4.2 |
| | Cyan toner | 75 | PAC | 1.0 | 75 | PAC | 1.0 | 20 | 78 | 4.2 |
| Comparative example2 | Yellow toner | 75 | PAC | 1.0 | 75 | PAC | 1.0 | 20 | 96 | 5.5 |
| | Cyan toner | 75 | PAC | 1.0 | 75 | PAC | 1.0 | 20 | 96 | 5.5 |
| Comparative example3 | Yellow toner | 75 | $MgCl_2$•$6H_2O$ | 10.0 | 75 | $MgCl_2$•$6H_2O$ | 10.0 | 20 | 87 | 5.5 |
| | Cyan toner | 75 | $MgCl_2$•$6H_2O$ | 10.0 | 75 | $MgCl_2$•$6H_2O$ | 10.0 | 20 | 87 | 5.5 |

Characteristics

The following characteristics of the toner particles in the toner of each example are measured according to the method described above.

- Content of divalent metal with respect to mass of toner particles (denoted as content A in tables)
- Content of divalent metal contained inside region to depth of 300 nm from surface of toner particle (denoted as content inside in tables)
- Content of trivalent metal with respect to mass of toner particle (denoted as content B in tables)
- Content of trivalent metal contained in region to depth of 300 nm from surface of toner particle (denoted as content in surface layer in tables)
- Ratio of content of divalent metal to content of trivalent metal (denoted as content A/content B in tables)
- Melting temperature of release agent
- Domain diameter of release agent
- Ratio of domain diameter of release agent to maximum diameter of toner particle
- Circularity of domain of release agent
- Gel fraction of binder resin
- Content of divalent metal with respect to mass of gel content of binder resin (denoted as content of divalent metal in gel content in tables).
- Content of trivalent metal with respect to mass of gel content of binder resin (denoted as content of trivalent metal in gel content in tables).

The results are listed in Tables 6 to 10.

Preparation of Electrostatic Charge Image Developer 8 parts by mass of the obtained toner and 100 parts by mass of a ferrite carrier (average particle diameter of 35 μm) coated with a resin are mixed to prepare a two-component developer, thereby obtaining a developer (electrostatic charge image developer).

Developing units of DocuPrint C2220 (manufactured by Fuji Xerox Co., Ltd.) are filled with each of the obtained developers, and the developers are seasoned in a low-temperature and low-humidity environment (10° C./15% RH) for 24 hours.

Evaluation

Evaluation of Gloss Unevenness

The gloss unevenness is evaluated as follows using the obtained developers. The results are listed in Tables 6 to 10.

Developing devices of an image forming device “DocuCentre color 400” (manufactured by Fujifilm Business Innovation Corp.) are filled with each of the developers obtained in each example. With the image forming device, the Electrophotographic Society Test Chart No. 5-1 is output on 1001 sheets of OS coated paper (product name: OS coated paper W, manufactured by Fujifilm Business Innovation Corp., 127 $g/m^2$) at a process speed of 228 mm/s in an environment of a temperature of 35° C. and a humidity of 85% RH.

The gloss of the green halftone portion (the image on the top of the 6th column from the right) of each of the 11 images (the Electrophotographic Society Test Chart No. 5-1) up to the 1001st image for every 100 images and the first image which have been output is measured by the following method.

The gloss is measured using a portable gloss meter (BYK-Gardner Micro-Tri-Gloss, manufactured by Toyo Seiki Seisaku-sho, Ltd.), 60-degree gloss is measured at five sites on the green halftone portion of each output image, and the average value thereof is acquired and defined as the gloss value. The evaluation is performed according to the following evaluation standards based on the gloss values of 11 sheets of images.

A: “Maximum gloss value−minimum gloss value” (that is, a difference in gloss) is less than 5°

B: “Maximum gloss value−minimum gloss value” (that is, a difference in gloss) is 5° or greater and less than 7°

C: “Maximum gloss value−minimum gloss value” (that is, a difference in gloss) is 7° or greater and less than 10°

D: “Maximum gloss value−minimum gloss value” (that is, a difference in gloss) is 10° or greater

TABLE 6

| | Type of toner | Volume average particle diameter of toner particles [µm] | Divalent metal | | | Trivalent metal | | | | Release agent and domain of release agent | |
|---|---|---|---|---|---|---|---|---|---|---|---|
| | | | Type | Content A [mmol/kg] | Content inside [%] | Type | Content B [mmol/kg] | Content surface layer [%] | Content A/Content B | Type | Melting temperature [° C.] |
| Example1 | Yellow toner | 5.5 | Mg | 10 | 85 | Al | 3.2 | 75 | 3.1 | Ester-based wax | 85 |
| | Cyan toner | 5.5 | Mg | 10 | 83 | Al | 3.1 | 73 | 3.2 | Ester-based wax | 85 |
| Example2 | Yellow toner | 5.5 | Mg | 10 | 84 | Al | 3.4 | 74 | 2.9 | Ester-based wax | 85 |
| | Cyan toner | 5.5 | Mg | 10 | 83 | Al | 3.3 | 77 | 3.0 | Ester-based wax | 85 |
| Example3 | Yellow toner | 5.5 | Mg | 10 | 79 | Al | 3.2 | 71 | 3.1 | Ester-based wax | 85 |
| | Cyan toner | 5.5 | Mg | 10 | 83 | Al | 3.3 | 78 | 3.0 | Ester-based wax | 85 |
| Example4 | Yellow toner | 6.5 | Mg | 10 | 92 | Al | 3.4 | 65 | 2.9 | Ester-based wax | 85 |
| | Cyan toner | 6.5 | Mg | 10 | 88 | Al | 3.3 | 67 | 3.0 | Ester-based wax | 85 |
| Example5 | Yellow toner | 3.8 | Mg | 10 | 64 | Al | 3.5 | 83 | 2.9 | Ester-based wax | 85 |
| | Cyan toner | 3.9 | Mg | 10 | 67 | Al | 3.2 | 81 | 3.1 | Ester-based wax | 85 |
| Example6 | Yellow toner | 3.8 | Mg | 10 | 65 | Al | 3.5 | 86 | 2.9 | Ester-based wax | 85 |
| | Cyan toner | 3.8 | Mg | 10 | 62 | Al | 3.4 | 86 | 2.9 | Ester-based wax | 85 |
| Example7 | Yellow toner | 5.5 | Mg | 0.4 | 95 | Al | 0.4 | 85 | 1.0 | Ester-based wax | 85 |
| | Cyan toner | 5.5 | Mg | 0.4 | 94 | Al | 0.4 | 80 | 1.0 | Ester-based wax | 85 |

| | Type of toner | Release agent and domain of release agent | | | Binder resin | | | |
|---|---|---|---|---|---|---|---|---|
| | | Domain diameter [µm] | Ratio of domain diameter to maximum diameter of toner particle [%] | Circularity | Gel fraction [% by mass] | Content of divalent metal in gal content [mmol/kg] | Content of trivalent metal in gal content [mmol/kg] | Evaluation Gloss unevenness |
| Example1 | Yellow toner | 0.5 | 9.1 | 0.99 | 3 | 42 | 73 | B |
| | Cyan toner | 0.55 | 10.0 | 0.99 | 4 | 40 | 72 | |
| Example2 | Yellow toner | 1.0 | 18.2 | 0.99 | 4 | 45 | 76 | A |
| | Cyan toner | 1.1 | 20.0 | 0.99 | 3 | 43 | 73 | |
| Example3 | Yellow toner | 1.4 | 25.5 | 0.99 | 4 | 44 | 72 | A |
| | Cyan toner | 1.5 | 27.3 | 0.99 | 4 | 42 | 76 | |
| Example4 | Yellow toner | 1.7 | 26.2 | 0.99 | 3 | 43 | 70 | B |
| | Cyan toner | 1.6 | 24.6 | 0.99 | 4 | 43 | 83 | |
| Example5 | Yellow toner | 0.4 | 10.5 | 0.99 | 3 | 42 | 71 | B |
| | Cyan toner | 0.4 | 10.3 | 0.99 | 4 | 43 | 72 | |
| Example6 | Yellow toner | 1.4 | 36.8 | 0.99 | 4 | 46 | 78 | B |
| | Cyan toner | 1.3 | 34.2 | 0.99 | 3 | 45 | 76 | |
| Example7 | Yellow toner | 1.2 | 21.8 | 0.99 | 0.7 | 15 | 37 | B |
| | Cyan toner | 1.3 | 23.6 | 0.99 | 0.6 | 13 | 35 | |

TABLE 7

| | Type of toner | Volume average particle diameter of toner particles | Divalent metal Type | Divalent metal Content A [mmol/kg] | Divalent metal Content inside [%] | Trivalent metal Type | Trivalent metal Content B [mmol/kg] | Trivalent metal Content surface layer [%] | Content A/Content B | Release agent and domain of release agent Type | Release agent and domain of release agent Melting temperature [° C.] |
|---|---|---|---|---|---|---|---|---|---|---|---|
| Example8 | Yellow toner | 5.5 | Mg | 0.7 | 93 | Al | 0.7 | 82 | 1.0 | Ester-based wax | 85 |
| | Cyan toner | 5.5 | Mg | 0.7 | 94 | Al | 0.7 | 83 | 1.0 | Ester-based wax | 85 |
| Example9 | Yellow toner | 5.6 | Mg | 42 | 83 | Al | 34 | 71 | 1.2 | Ester-based wax | 85 |
| | Cyan toner | 5.7 | Mg | 41 | 82 | Al | 35 | 75 | 1.2 | Ester-based wax | 85 |
| Example10 | Yellow toner | 5.8 | Mg | 51 | 72 | Al | 56 | 72 | 0.9 | Ester-based wax | 85 |
| | Cyan toner | 5.7 | Mg | 52 | 79 | Al | 52 | 68 | 1.0 | Ester-based wax | 85 |
| Example11 | Yellow toner | 5.5 | Mg | 16 | 83 | Al | 1.3 | 81 | 12.3 | Ester-based wax | 85 |
| | Cyan toner | 5.5 | Mg | 16 | 82 | Al | 1.2 | 78 | 13.3 | Ester-based wax | 85 |
| Example12 | Yellow toner | 5.5 | Mg | 16 | 81 | Al | 1.6 | 78 | 10.0 | Ester-based wax | 85 |
| | Cyan toner | 5.5 | Mg | 16 | 85 | Al | 1.7 | 80 | 9.4 | Ester-based wax | 85 |
| Example13 | Yellow toner | 5.5 | Mg | 10 | 78 | Al | 36 | 72 | 0.28 | Ester-based wax | 85 |
| | Cyan toner | 5.5 | Mg | 10 | 82 | Al | 35 | 70 | 0.29 | Ester-based wax | 85 |
| Example14 | Yellow toner | 5.5 | Mg | 10 | 82 | Al | 25 | 77 | 0.4 | Ester-based wax | 85 |
| | Cyan toner | 5.5 | Mg | 10 | 83 | Al | 24 | 76 | 0.4 | Ester-based wax | 85 |

| | Type of toner | Release agent and domain of release agent Domain diameter [μm] | Release agent and domain of release agent Ratio of domain diameter to maximum diameter of toner particle [%] | Circularity | Binder resin Gel fraction [% by mass] | Binder resin Content of divalent metal in gal content [mmol/kg] | Binder resin Content of trivalent metal in gal content [mmol/kg] | Evaluation Gloss unevenness |
|---|---|---|---|---|---|---|---|---|
| Example8 | Yellow toner | 1.1 | 20.0 | 0.99 | 1.1 | 18 | 40 | B |
| | Cyan toner | 1.2 | 21.8 | 0.99 | 1.2 | 19 | 42 | |
| Example9 | Yellow toner | 0.8 | 14.3 | 0.99 | 5 | 52 | 103 | A |
| | Cyan toner | 0.9 | 15.8 | 0.99 | 4 | 54 | 112 | |
| Example10 | Yellow toner | 0.8 | 13.8 | 0.99 | 6 | 65 | 121 | B |
| | Cyan toner | 0.8 | 14.0 | 0.99 | 5 | 63 | 135 | |
| Example11 | Yellow toner | 1.1 | 20.0 | 0.99 | 2 | 40 | 42 | B |
| | Cyan toner | 1.0 | 18.2 | 0.99 | 2 | 39 | 47 | |
| Example12 | Yellow toner | 1.0 | 18.2 | 0.99 | 2 | 48 | 45 | A |
| | Cyan toner | 1.1 | 20.0 | 0.99 | 2 | 43 | 46 | |
| Example13 | Yellow toner | 0.8 | 14.5 | 0.99 | 5 | 45 | 115 | B |
| | Cyan toner | 0.9 | 16.4 | 0.99 | 4 | 47 | 114 | |
| Example14 | Yellow toner | 0.9 | 16.4 | 0.99 | 4 | 46 | 105 | A |
| | Cyan toner | 1.0 | 18.2 | 0.99 | 3 | 45 | 107 | |

TABLE 8

| | Type of toner | Volume average particle diameter of toner particles [µm | Divalent metal Type | Divalent metal Content A [mmol/kg] | Divalent metal Content inside [%] | Trivalent metal Type | Trivalent metal Content B [mmol/kg] | Trivalent metal Content surface layer [%] | Content A/Content B | Release agent and domain of release agent Type | Release agent and domain of release agent Melting temperature [° C.] |
|---|---|---|---|---|---|---|---|---|---|---|---|
| Example15 | Yellow toner | 5.5 | Mg | 10 | 85 | Al | 3.2 | 48 | 3.1 | Ester-based wax | 85 |
| | Cyan toner | 5.5 | Mg | 10 | 85 | Al | 3.3 | 46 | 3.0 | Ester-based wax | 85 |
| Example16 | Yellow toner | 5.5 | Mg | 10 | 54 | Al | 3.3 | 53 | 3.0 | Ester-based wax | 85 |
| | Cyan toner | 5.5 | Mg | 10 | 53 | Al | 3.5 | 53 | 2.9 | Ester-based wax | 85 |
| Example17 | Yellow toner | 5.5 | Ca | 0.7 | 87 | Al | 0.7 | 83 | 1.00 | Ester-based wax | 85 |
| | Cyan toner | 5.5 | Ca | 0.7 | 86 | Al | 0.7 | 85 | 1.00 | Ester-based wax | 85 |
| Example18 | Yellow toner | 5.7 | Ca | 45 | 80 | Al | 33 | 70 | 1.36 | Ester-based wax | 85 |
| | Cyan toner | 5.8 | Ca | 46 | 78 | Al | 35 | 68 | 1.31 | Ester-based wax | 85 |
| Example19 | Yellow toner | 5.5 | Mg | 0.7 | 93 | Fe | 0.6 | 73 | 1.17 | Ester-based wax | 85 |
| | Cyan toner | 5.5 | Mg | 0.7 | 94 | Fe | 0.6 | 72 | 1.17 | Ester-based wax | 85 |
| Example20 | Yellow toner | 5.6 | Mg | 42 | 83 | Fe | 35 | 68 | 1.20 | Ester-based wax | 85 |
| | Cyan toner | 5.7 | Mg | 41 | 82 | Fe | 30 | 65 | 1.37 | Ester-based wax | 85 |
| Example21 | Yellow toner | 5.5 | Mg | 10 | 84 | Al | 3.4 | 74 | 2.9 | Ester-based wax | 60 |
| | Cyan toner | 5.5 | Mg | 10 | 83 | Al | 3.3 | 77 | 3.0 | Ester-based wax | 60 |

| | Type of toner | Release agent and domain of release agent Domain diameter [µm] | Release agent and domain of release agent Ratio of domain diameter to maximum diameter of toner particle [%] | Circu-larity | Binder resin Gel fraction [% by mass ] | Binder resin Content of divalent metal in gal content [mmol/kg] | Binder resin Content of trivalent metal in gal content [mmol/kg] | Evaluation Gloss un-evenness |
|---|---|---|---|---|---|---|---|---|
| Example15 | Yellow toner | 1.0 | 18.2 | 0.99 | 3 | 40 | 71 | B |
| | Cyan toner | 1.0 | 18.2 | 0.99 | 2 | 41 | 72 | |
| Example16 | Yellow toner | 1.1 | 20.0 | 0.99 | 3 | 46 | 83 | B |
| | Cyan toner | 1.0 | 18.2 | 0.99 | 3 | 47 | 71 | |
| Example17 | Yellow toner | 1.2 | 21.8 | 0.99 | 0.6 | 7 | 42 | C |
| | Cyan toner | 1.3 | 23.6 | 0.99 | 0.5 | 6 | 43 | |
| Example18 | Yellow toner | 0.7 | 12.3 | 0.99 | 4 | 38 | 113 | B |
| | Cyan toner | 0.8 | 13.8 | 0.99 | 4 | 40 | 111 | |
| Example19 | Yellow toner | 1.1 | 20.0 | 0.99 | 0.3 | 12 | 35 | C |
| | Cyan toner | 1.2 | 21.8 | 0.99 | 0.4 | 13 | 34 | |
| Example20 | Yellow toner | 0.7 | 12.5 | 0.99 | 3 | 42 | 68 | B |
| | Cyan toner | 0.7 | 12.3 | 0.99 | 3 | 43 | 65 | |
| Example21 | Yellow toner | 1.8 | 32.7 | 0.99 | 3 | 45 | 73 | C |
| | Cyan toner | 1.7 | 30.9 | 0.99 | 2 | 47 | 75 | |

TABLE 9

| | Type of toner | Volume average particle diameter of toner particles [μm | Divalent metal Type | Divalent metal Content A [mmol/kg] | Divalent metal Content inside [%] | Trivalent metal Type | Trivalent metal Content B [mmol/kg] | Trivalent metal Content surface layer | Content A/Content B | Release agent and domain of release agent Type | Release agent and domain of release agent Melting temperature [° C.] |
|---|---|---|---|---|---|---|---|---|---|---|---|
| Example22 | Yellow toner | 5.5 | Mg | 10 | 84 | Al | 3.4 | 75 | 2.9 | Ester-based wax | 67 |
| | Cyan toner | 5.5 | Mg | 10 | 83 | Al | 3.3 | 77 | 3.0 | Ester-based wax | 67 |
| Example23 | Yellow toner | 5.5 | Mg | 10 | 81 | Al | 3.4 | 76 | 2.9 | Ester-based wax | 68 |
| | Cyan toner | 5.5 | Mg | 10 | 82 | Al | 3.3 | 73 | 3.0 | Ester-based wax | 68 |
| Example24 | Yellow toner | 5.5 | Mg | 10 | 81 | Al | 3.4 | 76 | 2.9 | Ester-based wax | 89 |
| | Cyan toner | 5.5 | Mg | 10 | 82 | Al | 3.3 | 73 | 3.0 | Ester-based wax | 89 |
| Example25 | Yellow toner | 5.5 | Mg | 10 | 84 | Al | 3.4 | 74 | 2.9 | Ester-based wax | 85 |
| | Cyan toner | 5.5 | Mg | 15 | 84 | Al | 4.5 | 74 | 3.3 | Ester-based wax | 85 |
| Example26 | Yellow toner | 5.5 | Mg | 10 | 85 | Al | 3.2 | 75 | 3.1 | Ester-based wax | 85 |
| | Cyan toner | 5.5 | Mg | 10 | 83 | Al | 3.3 | 78 | 3.0 | Ester-based wax | 85 |
| Example27 | Yellow toner | 5.5 | Mg | 10 | 85 | Al | 3.2 | 75 | 3.1 | Ester-based wax | 85 |
| | Cyan toner | 5.5 | Mg | 10 | 83 | Al | 3.1 | 73 | 3.2 | Ester-based wax | 85 |
| Example28 | Yellow toner | 5.5 | Mg | 10 | 84 | Al | 3.4 | 74 | 2.9 | Ester-based wax | 85 |
| | Cyan toner | 5.5 | Mg | 10 | 83 | Al | 3.3 | 77 | 3.0 | Ester-based wax | 85 |
| Example29 | Yellow toner | 5.5 | Mg | 10 | 79 | Al | 3.2 | 71 | 3.1 | Ester-based wax | 85 |
| | Cyan toner | 5.5 | Mg | 10 | 83 | Al | 3.3 | 78 | 3.0 | Ester-based wax | 85 |

| | Type of toner | Release agent and domain of release agent Domain diameter [μm] | Release agent and domain of release agent Ratio of domain diameter to maximum diameter of toner particle [%] | Circu-larity | Binder resin Gel fraction [% by mass] | Binder resin Content of divalent metal in gal content [mmol/kg] | Binder resin Content of trivalent metal in gal content [mmol/kg] | Evaluation Gloss un-evenness |
|---|---|---|---|---|---|---|---|---|
| Example22 | Yellow toner | 1.4 | 25.5 | 0.99 | 3 | 40 | 71 | A |
| | Cyan toner | 1.5 | 27.3 | 0.99 | 3 | 42 | 72 | |
| Example23 | Yellow toner | 1.4 | 25.5 | 0.75 | 3 | 46 | 73 | B |
| | Cyan toner | 1.3 | 23.6 | 0.78 | 3 | 40 | 75 | |
| Example24 | Yellow toner | 0.9 | 16.4 | 0.82 | 2 | 42 | 75 | B |
| | Cyan toner | 0.8 | 14.5 | 0.87 | 3 | 47 | 76 | |
| Example25 | Yellow toner | 1.0 | 18.2 | 0.99 | 4 | 45 | 76 | A |
| | Cyan toner | 1.0 | 18.2 | 0.99 | 4 | 40 | 75 | |
| Example26 | Yellow toner | 0.5 | 9.1 | 0.99 | 3 | 41 | 76 | C |
| | Cyan toner | 1.5 | 27.3 | 0.99 | 4 | 42 | 76 | |
| Example27 | Yellow toner | 0.4 | 7.3 | 0.99 | 13 | 40 | 76 | C |
| | Cyan toner | 0.5 | 9.1 | 0.99 | 12 | 45 | 75 | |

TABLE 9-continued

| | Type of toner | | | | | | | |
|---|---|---|---|---|---|---|---|---|
| Example28 | Yellow toner | 0.8 | 14.5 | 0.99 | 10 | 47 | 73 | B |
| | Cyan toner | 0.9 | 16.4 | 0.99 | 14 | 49 | 73 | |
| Example29 | Yellow toner | 1.3 | 23.6 | 0.99 | 11 | 43 | 71 | B |
| | Cyan toner | 1.4 | 25.5 | 0.99 | 12 | 42 | 72 | |

TABLE 10

| | Type of toner | Volume average particle diameter of toner particles [μm | Divalent metal Type | Divalent metal Content A [mmol/kg] | Divalent metal Content inside [%] | Trivalent metal Type | Trivalent metal Content B [mmol/kg] | Trivalent metal Content surface layer [%] | Content A/Content B | Release agent and domain of release agent Type | Release agent and domain of release agent Melting temperature [° C.] |
|---|---|---|---|---|---|---|---|---|---|---|---|
| Comparative example1 | Yellow toner | 4.2 | Mg | 10 | 64 | Al | 3.5 | 83 | 2.9 | Ester-based wax | 85 |
| | Cyan toner | 4.2 | Mg | 10 | 67 | Al | 3.2 | 81 | 3.1 | Ester-based wax | 85 |
| Comparative example2 | Yellow toner | 5.5 | Mg | 10 | 92 | Al | 3.4 | 65 | 2.9 | Ester-based wax | 85 |
| | Cyan toner | 5.5 | Mg | 10 | 88 | Al | 3.3 | 67 | 3.0 | Ester-based wax | 85 |
| Comparative example3 | Yellow toner | 5.5 | Mg | 13 | 84 | — | — | — | — | Ester-based wax | 85 |
| | Cyan toner | 5.5 | Mg | 13 | 83 | — | — | — | — | Ester-based wax | 85 |

| | Type of toner | Release agent and domain of release agent Domain diameter [μm] | Release agent and domain of release agent Ratio of domain diameter to maximum diameter of toner particle [%] | Circu-larity | Binder resin Gel fraction [% by mass] | Binder resin Content of divalent metal in gal content [mmol/kg] | Binder resin Content of trivalent metal in gal content [mmol/kg] | Evaluation Gloss un-evenness |
|---|---|---|---|---|---|---|---|---|
| Comparative example1 | Yellow toner | 0.4 | 9.5 | 0.99 | 3 | 43 | 72 | D |
| | Cyan toner | 0.4 | 9.5 | 0.99 | 3 | 42 | 70 | |
| Comparative example2 | Yellow toner | 1.7 | 30.9 | 0.99 | 3 | 41 | 73 | D |
| | Cyan toner | 1.8 | 32.7 | 0.99 | 2 | 48 | 75 | |
| Comparative example3 | Yellow toner | 1.2 | 21.8 | 0.99 | 0.5 | 46 | — | D |
| | Cyan toner | 1.3 | 23.6 | 0.99 | 0.6 | 45 | — | |

As shown in the above-described results, it is found that the gloss unevenness in the output image is suppressed in the present example even under the condition of outputting the secondary color halftone, as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

a toner particle containing a binder resin, a release agent, a divalent metal, and a trivalent metal, wherein the release agent has a domain diameter of 0.5 μm or greater and 1.5 μm or less, the trivalent metal is aluminum (Al), and a content of the trivalent metal with respect to a mass of the toner particle is 0.5 mmol/kg or greater and 50 mmol/kg or less.

2. An electrostatic charge image developing toner comprising:

a toner particle containing a binder resin, a release agent, a divalent metal, and a trivalent metal, wherein a ratio of a domain diameter of the release agent to a maximum diameter of the toner particle is 10% or greater and 30% or less, the trivalent metal is Al, and a content of the trivalent metal with respect to a mass of the toner particle is 0.5 mmol/kg or greater and 50 mmol/kg or less.

3. The electrostatic charge image developing toner according to claim 1, wherein a content of the divalent metal with respect to the mass of the toner particle is 0.5 mmol/kg or greater and 50 mmol/kg or less.

4. The electrostatic charge image developing toner according to claim 3, wherein a ratio (content mol number of divalent metal/content mol number of trivalent metal) of the content of the divalent metal to the content of the trivalent metal is 0.3 or greater and 10 or less.

5. The electrostatic charge image developing toner according to claim 1, wherein 50% or greater of the trivalent metal in terms of mol number is present in a region of the toner particle to a depth of 300 nm from a surface, and 60% or greater of the divalent metal in terms of mol number is present in a region from the center of the toner particle core to the depth of 300 nm from the surface.

6. The electrostatic charge image developing toner according to claim 1, wherein a gel fraction of the binder resin in the toner particle is 1% by mass or greater and 10% by mass or less.

7. The electrostatic charge image developing toner according to claim 6, wherein a content of the divalent metal with respect to a mass of a gel content of the binder resin is 10 mmol/kg or greater and 50 mmol/kg or less, and a content of the trivalent metal with respect to the mass of the gel content of the binder resin is 20 mmol/kg or greater and 150 mmol/kg or less.

8. The electrostatic charge image developing toner according to claim 1, wherein the divalent metal is at least one selected from the group consisting of Ca and Mg.

9. The electrostatic charge image developing toner according to claim 1, wherein a melting temperature of the release agent is 65° C. or higher and 85° C. or lower.

10. The electrostatic charge image developing toner according to claim 1, wherein a circularity of a domain of the release agent is 0.9 or greater and 1.0 or less.

11. The electrostatic charge image developing toner according to claim 10, wherein the release agent is an ester-based wax.

12. An electrostatic charge image developer comprising:

the electrostatic charge image developing toner according to claim 1.

13. A toner cartridge comprising:

a container that accommodates the electrostatic charge image developing toner according to claim 1, wherein the toner cartridge is detachable from an image forming device.

* * * * *